(12) United States Patent
Vedula et al.

(10) Patent No.: US 7,159,185 B1
(45) Date of Patent: Jan. 2, 2007

(54) FUNCTION OBJECTS

(75) Inventors: Nagender P. Vedula, Bothell, WA (US); Dharma K. Shukla, Bellevue, WA (US); Aditya G. Bhandarkar, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 838 days.

(21) Appl. No.: 09/662,399

(22) Filed: Sep. 14, 2000

(51) Int. Cl.
G06F 9/44 (2006.01)
G06F 17/00 (2006.01)

(52) U.S. Cl. ............... 715/763; 715/513; 715/810; 715/853; 717/109

(58) Field of Classification Search .......... 345/718, 345/726, 746, 763, 967; 715/853, 718, 726, 715/746, 763, 967, 804, 805, 835, 837, 810; 715/513, 523; 717/105, 108, 109, 113, 162; 719/331, 332
See application file for complete search history.

(56) References Cited

U.S. PATENT DOCUMENTS

| | | | |
|---|---|---|---|
| 5,629,846 A | 5/1997 | Crapo | 395/785 |
| 5,708,828 A * | 1/1998 | Coleman | 715/523 |
| 5,734,905 A * | 3/1998 | Oppenheim | 709/315 |
| 5,778,227 A * | 7/1998 | Jordan | 707/103 R |
| 5,808,615 A | 9/1998 | Hill et al. | 345/356 |
| 6,054,986 A * | 4/2000 | Kato | 345/763 |
| 6,216,131 B1 * | 4/2001 | Liu et al. | 707/102 |
| 6,282,699 B1 * | 8/2001 | Zhang et al. | 717/109 |
| 6,356,901 B1 * | 3/2002 | MacLeod et al. | 707/6 |
| 6,493,003 B1 * | 12/2002 | Martinez | 345/781 |
| 6,496,870 B1 * | 12/2002 | Faustini | 709/316 |

OTHER PUBLICATIONS

Microsoft Corp., "The Component Object Model Specification, Part 1: Component Object Model Introduction." Version 0.9, Oct. 24, 1995. [retreived on Feb. 26, 2003]. Retrieved from the Internet <URL: http://activex.adsp.or.jp/Japanese?Specs/COM_Spec\COMCHO1.Htm.*
Aker, Sharon Zardetto. "The Macintosh Bible." 1998. Berkeley CA : Peachpit Press. 7th ed. pp. 2-22.*

* cited by examiner

Primary Examiner—Tadesse Hailu
Assistant Examiner—Blaine Basom
(74) Attorney, Agent, or Firm—Amin, Turocy & Calvin, LLP

(57) ABSTRACT

Methods and tools are provided for graphically creating a mapping between a source object and a target object. The invention includes function objects or functoids, which may be graphically linked between a source object and a target object in a graphical user interface of a mapping tool. The function objects include a script component adapted to perform a function, a graphical component allowing a user to use the function object in creating a mapping in a mapping tool graphical user interface, and an interface component providing access to the script and graphical components. The invention further comprises methodologies and tools for creating such a mapping using one or more of the function objects, as well as a method and tool for creating function objects.

45 Claims, 27 Drawing Sheets

Functoid Properties

| General | Script |

Input Parameters

- /BLANKSPECIFICATION/RECORD1/RECORD2/@FIELD1
- /BLANKSPECIFICATION/RECORD1/RECORD2/RECORD3/@FIELD1
- C  Hello World OK    Cancel This functoid must have at least 1 parameter. There is no maximum limit on the number of input parameters.

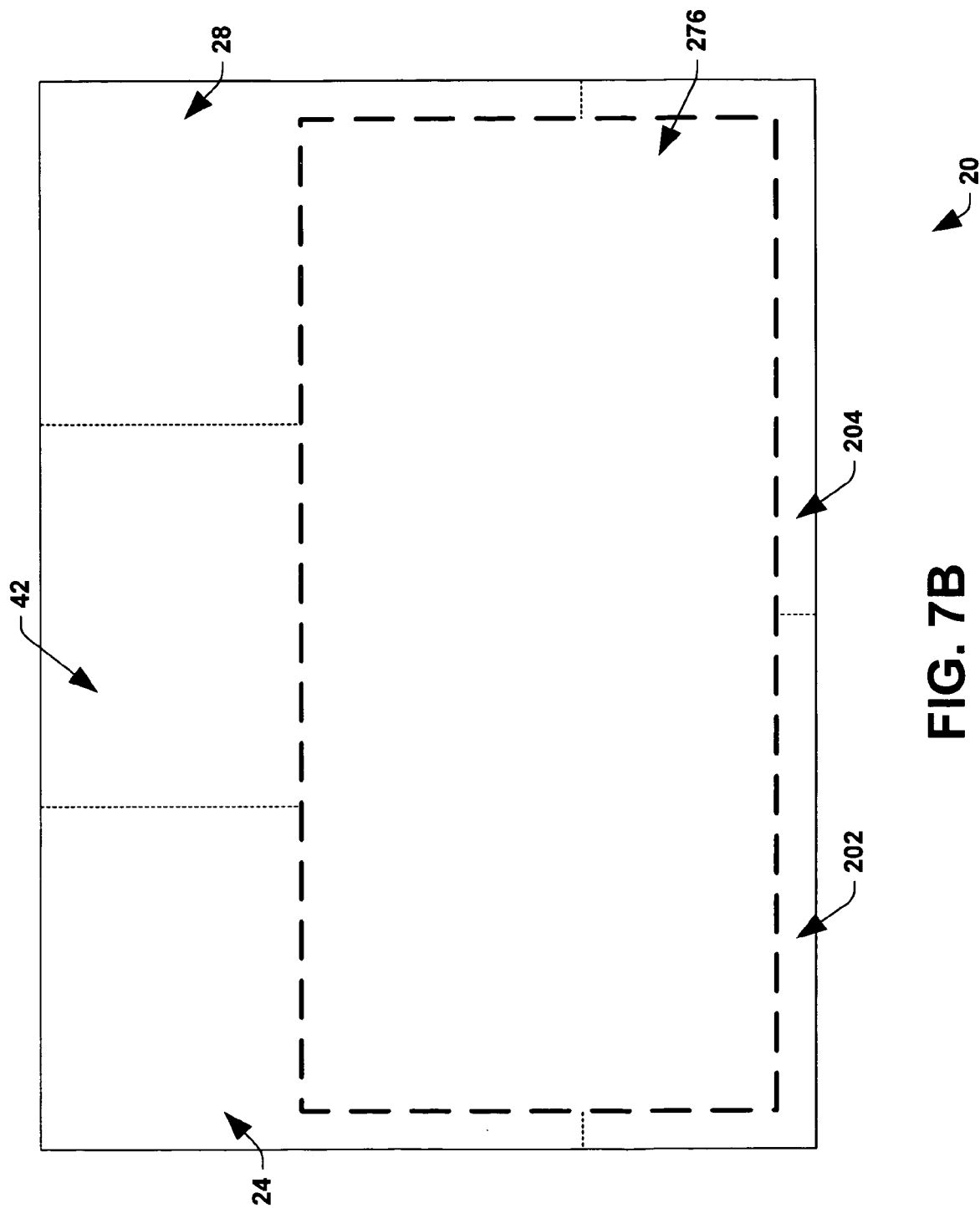

FIG. 7C

```
Properties | Values | Output

<xsl:template match='X1'>
<X2>
<xsl:for-each select='Record1'>
  <Record3>
    <xsl:variable name='var:v1' select='user:FctMathAdd2(string(@Field1),string(@Field2))'/>
    <xsl:attribute name='Field6'><xsl:value-of select='$var:v1'/></xsl:attribute>
    <xsl:variable name='var:v2' select='user:FctMathMultiply2(string@Field3),string($var:v1))'/>
    <xsl:attribute name='Field7'><xsl:value-of select='$var:v2'/></xsl:attribute>
  </Record3>
</xsl:for-each>
<xsl:for-each select='Record2'>
  <Record4>
    <xsl:variable name='var:v3' select='user:FctMathAdd2(string(ancestor::*(1)/Record1/@Field1),string(
    <xsl:variable name='var:v4' select='user:FctMathMultiply2(string(ancestor::*(1)/Record1/@Field3),str
    <xsl:variable name='var:v5' select='user:FctMathDivide(string($var:v4),string(@Field5))'/>
    <xsl:attribute name='Field8'><xsl:value-of select='$var:v5'/></xsl:attribute>
    <xsl:variable name='var:v6' select='user:FctMathSubtract2(string($var:v4),string(@Field4))'/>
    <xsl:attribute name='Field9'><xsl:value-of select='$var:v6'/></xsl:attribute>
  </Record4>
</xsl:for-each>
```

278

280

FUNCTION OBJECTS

TECHNICAL FIELD

The present invention relates to mapping a source object with a target object. More particularly, the invention relates to function objects, which may be used for defining a mapping between a source object and a target object.

BACKGROUND OF THE INVENTION

The internet is enabling businesses to develop new ways to facilitate efficient and automated interactions between their own internal line of business, productivity and knowledge management applications, the applications used by their customers and trading partners, and services provided by their commercial and corporate providers. The challenges associated with enabling such efficient and automated interactions between applications across business boundaries in a cost effective manner are similar to those associated with enabling them within an enterprise or departmental boundary. Building business-to-business (B2B) e-commerce systems presents many challenges to the system architect. Often, each company involved stores their data and documents in formats that are different from the formats used by the other participating companies. These companies need a way to integrate what tend to be vastly different systems. In addition, Internet security issues are involved in business to business data interchange. Thus, several challenges are faced by businesses, governments, and other entities wishing to interact via electronic documents and other forms of electronic commerce.

The challenges to interaction across business boundaries include lack of a sufficiently flexible and rich universal language to specify, package, publish, and exchange both structured and unstructured information across application or business boundaries. Other difficulties include a lack of a flexible and rich universal language to specify, package, publish, and execute transformation rules to convert information from one format to the other as application and business boundaries are crossed, and a lack of middleware-neutral application level communication protocols to enable automated interactions across application or business boundaries. The extensible Markup Language (XML), and XML-based schema languages enable businesses and other users to describe and exchange structured information between collaborating applications or business partners in a platform and middleware neutral manner.

Domain specific standards bodies and industry initiatives have started to adopt XML and XML-based schema languages to specify both their vocabularies and content models. These schemas are becoming widely published and implemented to facilitate communication between both applications and businesses. Wide support of XML has also resulted in independent solution providers developing solutions that enable the exchange of XML-based information with other external third party or custom developed applications. Several solution or middleware/platform specific approaches have been taken to address the lack of middleware-neutral application level communication protocols.

However, no single proprietary solution or middleware platform meets all the needs of a complex deployment environment. In addition, the cost and complexity of integrating together enterprise resource planning (ERP) systems, inventory management systems, or sales tracking systems within a single organization strains the capabilities of most large and small companies alike. In the near future, electronic commerce is going to require massive amounts of application integration across multiple organizations, as trading partners turn to the Internet to automate supply chains, forecasting systems, government services, and new types of business interchanges.

Although XML provides a standardized format for document definition, conventional development tools require system developers to create code for mapping individual source document schemas with target schemas in order to facilitate the interchange of information between business organizations or entities. In a typical example, two companies may create schemas for their documents in XML. Where these companies want to exchange information via internal documents, an XML schema is created for documents at each company, and a system developer generates code for mapping information transfer between the source and target document schemas. Such mapping code may be developed in a language such as extensible Stylesheet Language (XSL). A developer may thus create an XSL style sheet representation of a mapping between source and target schemas.

An XSL style sheet is a form of mapping which includes a template of the desired target structure, and identifies data in the source document to insert into this template. This model for merging data and templates is referred to as the template-driven model and works well on regular and repetitive data. XSL also provides capabilities for handling highly irregular and recursive data such as is typical in documents. Template fragments are defined, and the XSL processor combines the results of these fragments into a final result tree based on the shape of the source data. Each template fragment declares the type and context of source nodes it is appropriate for, allowing the XSL processor to match source nodes with template fragments. This model is known as the data-driven model since the shape of the data drives the shape of the final output. An XSL transformation process is thus independent of any particular output grammar and can be used for translating XML data from one schema (source) to another (target).

Heretofore, system developers have provided code defining the interrelationships between XML business documents, based on the desired information to be exchanged via electronic commerce applications. However, for each source and target document set, code must be written mapping the relationships therebetween. Whether the code representing such a mapping is written in XSL or another language, writing this code is difficult and typically beyond the capabilities of ordinary business personnel. Conventional mapping development tools require a user to program document schema mappings using specialized, often proprietary, programming languages. The complexity of such programming languages and the learning curve associated therewith has heretofore discouraged average business personnel from attempting to create document mappings without the aid of experienced programmers. Improved tools are thus desirable to enable business personnel to define document mappings for business to business applications, as well as to generate mapping code, which do not require extensive knowledge of software programming.

SUMMARY OF THE INVENTION

The invention provides methods and tools for graphically creating a mapping which overcome or minimize the above referenced shortcomings. In addition, the invention includes functoids or function objects, which are elemental units of functional transformation. The function object generically abstracts the concept of a function call, used as an object. This advantageously raises the status of a function call to the level of an object, thereby rendering the function call a primary citizen of an object-oriented language. The functoids or function objects may implement any number of related or unrelated functions via an interface component, and further represent a script.

These function objects or functoids may be graphically linked between a source object and a target object in a graphical user interface of a mapping tool. In addition to use in association with mapping tools, however, function objects may be advantageously employed in many applications. A function object includes a script component adapted to perform a function, a graphical component allowing a user to use the function object in association with a graphical user interface, for example, in creating a mapping in a mapping tool graphical user interface. In addition, function objects may include an interface component providing access to the script and graphical components. The invention further comprises methodologies and tools for creating such a mapping using one or more function objects. In addition, the invention provides a method and tool for creating a function object.

The function object abstracts function calls to functions that may be used to define a mapping between the source and target objects or schemas (e.g., a COM or other type object). A mapping tool may provide pre-defined function objects as well as support for custom or user-defined function objects. The function objects may be represented in such a mapping tool user interface as graphical objects in a mapping region of a display device, which may be associated or linked with source or target schema tree nodes and/or other function objects in order to provide the desired mapping functionality. Thus, in one application, the function objects form the basis for the representation of elemental units of transformation, which may be embedded into a document mapping. A compiler in the mapping tool may be used to generate output code, such as an XSL style sheet representation of the mapping, which includes the script component from the function objects used in defining the mapping. The compiled output code may then be used in translating source documents into target documents at runtime.

The function objects may implement an interface IFunctoid, which defines a generic protocol for calling any number of functions implemented by the function object. The IFunctoid interface may be, for example, a COM or other type interface. Several categories of these function objects may be implemented including mathematical, logical, date, conversion, scientific, and advanced. In addition, users may define their own custom function objects in accordance with the invention, thus providing extensibility. The mapping tool may further create a wrapper or container object for every function object, which supports the function object functionality as well as other object functionality, such as the IDropSource and IDataObject interfaces, whereby the function object graphical component may be dragged and dropped on a grid or mapping region in the mapping tool user interface.

In the user interface of a mapping tool, for example, a user may select a desired function object graphical component from a function object palette. The graphical components placed on the mapping screen region or grid of such a graphical user interface may then be modified, moved, deleted, copied, and/or connected with tree nodes and/or other function objects in order to create a desired mapping between a source tree and a target tree. The invention thus provides a significant improvement over existing mapping development tools and methodologies, which required a user to implement mapping code programs in sometimes complicated programming languages. The function objects or functoids provide an extensible mechanism by which complex mappings may be expeditiously created by graphically associating source and target object nodes via simple links and function object graphical components.

The function objects include a script element having computer-executable instructions for performing a function, which may be advantageously used by a compiler to generate mapping or other type output code. In this regard, the script component of a function object may be employed by a mapping tool compiler in association with mapping a source object with a target object. For example, the script associated with a function object graphical component in a mapping may be embedded by a mapping tool compiler into output code associated with the mapping. The script may be, for example, basic, visual basic, VB script, C++, visual C++, java, java script, Perl, or any scripting language. A function object in a mapping takes parameters from various fields in a source schema tree (or from other function objects) and operates on the parameters to generate an output parameter. A user may modify the parameters associated with a function object and may create custom function objects. In addition, a user may modify the script associated with a function object.

User-defined function objects may be created from scratch or by modifying existing function object parameters and script. The mapping tool may provide prompting or wizards to aid unsophisticated users in defining custom function objects, whereby the tool may construct the script component according to the desired functionality, and may further implement the interface (e.g., a COM or other type interface IFunctoid). In addition, the user may consult an Internet website from the mapping tool interface to access a library of function objects. The invention further comprises computer-readable media having computer-executable instructions for performing the various methodologies of the invention.

In accordance with one aspect of the present invention, there is provided a function object for use in creating a mapping between a source object having a source object node and a target object having a target object node in a mapping tool with a graphical user interface. The function object comprises a script component having computer-executable instructions for performing a function. The script may be, for example, in basic, visual basic, VB script, C++, visual C++, java, java script, Perl, or any scripting language. The function may be of any type, for example, mathematical, string operations, logical, conversion, scientific, and conversion, to provide the user with a wide variety of choices in creating a mapping. The function object further includes a graphical component associated with the function, having an input and an output, and adapted to allow a user to graphically associate the input with a source object node and to associate the output with a target object node in the graphical user interface. The graphical component allows easy manipulation of the function object in a graphical user interface mapping design environment, whereby links to and from the function objects may be created. In addition, the function object includes an interface component having a globally unique identifier and adapted to provide the script component to a compiler in the mapping tool and to provide the graphical component to the graphical user interface.

According to another aspect of the invention, there is provided a method of creating a mapping between a source object having a source object node and a target object having a target object node. The method includes providing a function object having a script component with computer-executable instructions for performing a function, a graphical component associated with the function with an input and an output, and an interface component, and displaying the graphical component in the user interface of a mapping tool. The function object may by displayed in a palette from which the user can drag and drop the graphical component onto a mapping screen region of the mapping tool user interface.

The method further includes graphically associating a source object node with the input using a user interface selection device, graphically associating a target object node with the output using the user interface selection device, and creating a mapping including the computer-executable instructions. The mapping may be operative to perform the function according to the source object node, and to provide an output value associated with the target object node according to the function.

According to yet another aspect of the invention, a mapping tool is provided with a graphical user interface for creating a mapping between a source object having a source object node and a target object having a target object node. The mapping tool comprises means for providing a function object having a script component with computer-executable instructions for performing a function, a graphical component associated with the function and having an input and an output, and an interface component, as well as a display device in the graphical user interface adapted to display the graphical component in the user interface. In addition, the tool includes a user interface selection device (e.g., a mouse) adapted to graphically associate a source object node with the input, and to graphically associate a target object node with the output. The association may include direct links with the function object, or may pass through other function objects in a cascaded fashion. The tool further includes a compiler adapted to create a mapping including the computer-executable instructions, and operative to perform the function according to the source object node, and to provide an output value associated with the target object node according to the function.

According to still another aspect of the invention, a method is provided for creating a function object for use in constructing a mapping between a source object and a target object. The method includes creating a script component having computer-executable instructions for performing a function using the user interface, and creating a graphical component associated with the function and having an input and an output. In addition, the method includes creating an interface component adapted to provide the script component to a compiler in the mapping tool and to provide the graphical component to the graphical user interface, and associating the script component, the graphical component, and the interface component. The user may be prompted for information by a function object creation tool (e.g., via a wizard), which may generate the computer-executable instructions for performing the function, as well as the interface component. In this way, an unsophisticated user may easily create custom function objects for use in creating mappings.

In accordance with yet another aspect of the invention, there is provided a function object creation tool for creating a function object, which may be employed in the creation of a mapping between a source object and a target object. The tool comprises means for creating a script component having computer-executable instructions for performing a function using the user interface, and means for creating a graphical component associated with the function and having an input and an output. In addition, the tool comprises means for creating an interface component adapted to provide the script component to a compiler in the mapping tool and to provide the graphical component to the graphical user interface, as well as means for associating the script component, the graphical component, and the interface component.

To the accomplishment of the foregoing and related ends, certain illustrative aspects of the present invention are hereinafter described with reference to the attached drawing figures. The following description and the annexed drawings set forth in detail certain illustrative applications and aspects of the invention. These are indicative, however, of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

The foregoing and other aspects of the invention will become apparent from the following detailed description of various aspects of the invention and the attached drawings in which:

FIG. 6C is a front elevation view of an exemplary function object properties page according to the invention;

FIG. 7B is a front elevation view of a graphical user interface having an output code page region according to the invention;

FIG. 7C is a front elevation view of an exemplary output code page according to the invention;

DETAILED DESCRIPTION OF THE INVENTION

Figure 1:
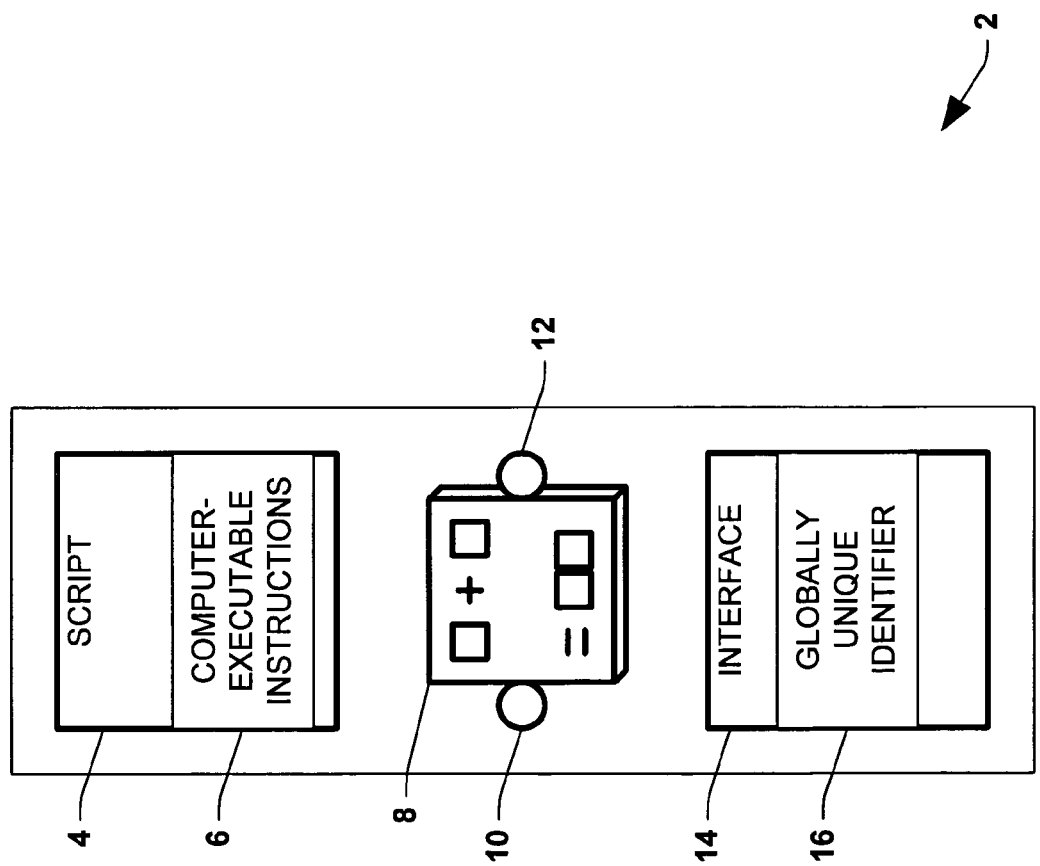
FIG. 1 is a schematic diagram illustrating an exemplary function object in accordance with an aspect of the present invention.

The following is a detailed description of the present invention made in conjunction with the attached figures, wherein like reference numerals will refer to like elements throughout. According to the invention, function objects or functoids are provided, which abstract the notion of function calls as primary citizens of an object-oriented language, and which may be graphically linked between a source object and a target object. The function objects comprise a script component, and an interface component. In addition, the function objects may include a graphical component. While various aspects of the invention are illustrated hereinafter in conjunction with one or more mapping tools, it will be appreciated that the function objects or functoids of the invention are not limited to application or employment in association with any particular tool or application. In this regard, it will be appreciated that while function objects or functoids find particular utility in association with such tools, that function objects may be employed, used, and/or created separate from any such tool and/or client within the scope of the invention and the attached claims.

A function object includes a script component adapted to perform a function, a graphical component allowing a user to use the function object in creating a mapping, and an interface component providing access to the script and graphical components. Function objects allow unsophisticated users to graphically define and compile a mapping without having to create functional computer-executable script, thus providing significant advantages over conventional methods.

The invention further comprises methodologies and tools for creating such a mapping using one or more function objects. In addition, the invention provides a method and tool for creating a function object. Although some of the implementations and aspects of the invention are illustrated and described hereinafter with respect to source and target objects which are XML schemas, the invention finds application with any type of source or target objects including, for example, schemas, databases, spreadsheets, documents, and the like.

In addition, while the computer-executable instructions included in the function object script component are illustrated in a specific scripting language, the invention may be applied to languages other than those illustrated and described herein. It will further be appreciated that the invention contemplates a computer-readable storage medium having computer-executable instructions for creating a mapping in a graphical user interface and for creating a function object.

Referring now to the drawings, FIG. 1 illustrates an exemplary function object or functoid 2, for use in creating a mapping in a mapping tool with a graphical user interface (not shown). The function object 2 includes a script component 4 having computer-executable instructions 6 for performing a function (not shown). As described in greater detail infra, the script component may be embedded into a compiled output mapping by a mapping tool compiler in accordance with an aspect of the invention. The function object 2 further comprises a graphical component 8 having an input 10 and an output 12. A user may associate the input 10 with a source object node and the output 12 with a target object node in creating a graphical mapping between a source object and a target object (not shown).

In addition, the object 2 includes an interface component 14 having a globally unique identifier 16. The identifier 16 allows a mapping tool to locate the object 2, for example, in a DLL file in a host computer memory, or in a remote website via the Internet. The interface object is further adapted to provide the script component 4 to a mapping tool compiler (not shown), and to provide the graphical component 8 to a mapping tool graphical user interface (not shown).

Figure 2:
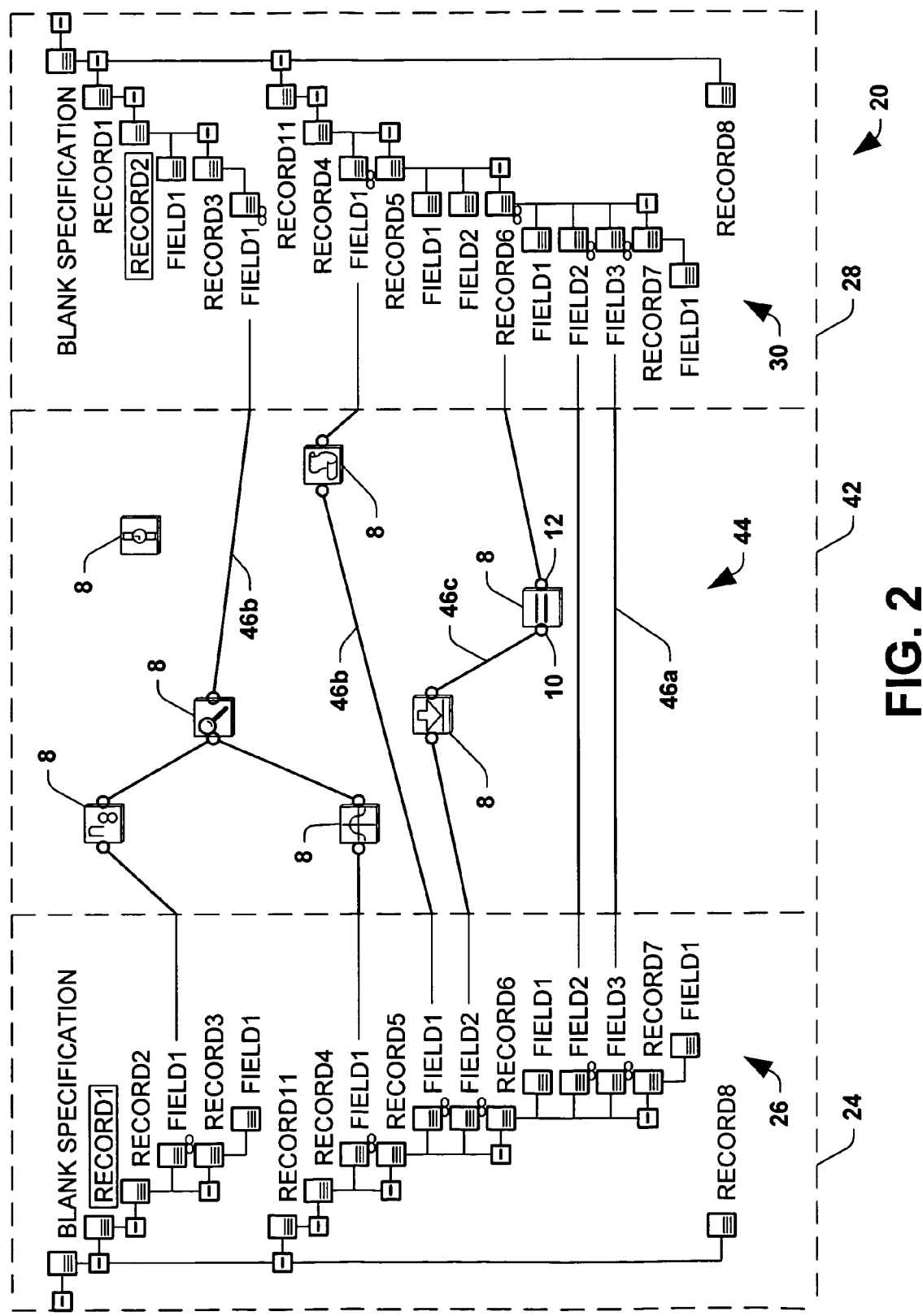
FIG. 2 is a front elevation view of an exemplary mapping tool graphical user interface having a source screen region, a target screen region, and a mapping screen region for creating a mapping between a source object and a target object using function objects in accordance with another aspect of the invention.

FIG. 2 illustrates an exemplary mapping tool graphical user interface 20 having a source screen region 24 adapted to display a graphical representation of a source object 26, a target screen region 28 adapted to display a graphical representation of a destination or target object 30, and a mapping screen region 42 for creating a mapping 44 between the source object 26 and the target object 30 in accordance with an aspect of the invention. The mapping 44 is created by a user via the interconnection of nodes (not numerically designated) in the source and target objects 26, 30, using links (collectively designated 46) and one or more function object graphical components 8. The graphical components 8 are displayed in the region 42 of the user interface 20 for easy interconnection between source nodes of the source object 26 and target nodes of the target object 30.

These interconnections may be made by placing function object graphical components 8 into the mapping screen region 42, and creating the links 46 via a user interface selection device (e.g., a mouse). Links 46 may be created directly between source and target object nodes (e.g., link 46*a*), between nodes and graphical components 8 (e.g., link 46*b*), and/or between different function object graphical components 8 (e.g., link 46*c*). The graphical components 8 are linked to nodes and/or to other function object graphical components via the inputs 10 and outputs 12 associated therewith. While the function object graphical components 8 are illustrated in FIG. 2 with a single input 10 and a single output 12, it will be appreciated that multiple input and/or multiple output function objects are within the scope of the invention, and that the graphical components 8 may comprise corresponding graphical indicia thereof. It will be further appreciated that the association between a graphical component input 10 and a source object node, as well as the association between an output 12 and a target object node may be established through a series of other function object graphical components 8, whereby cascaded mapping functionality is easily achieved.

The source and target objects 26 and 30, respectively, may comprise XML or other schemas, spreadsheets, documents, databases, and/or other information or data sources. The user interface 20 may accordingly be adapted to display the objects 26 and 30 in a hierarchical tree structure to allow for ease of mapping creation. Once a mapping (e.g., mapping 44) has been created in the mapping screen region 42, a user may invoke a compiler (not shown) in the mapping tool, which generates compiled output code which may then be used in a runtime engine to translate source documents into target or destination documents. The output code will advantageously include the computer-executable instructions 6 from the script component 4, to perform the function associated with the function object graphical component 8.

Figure 3:
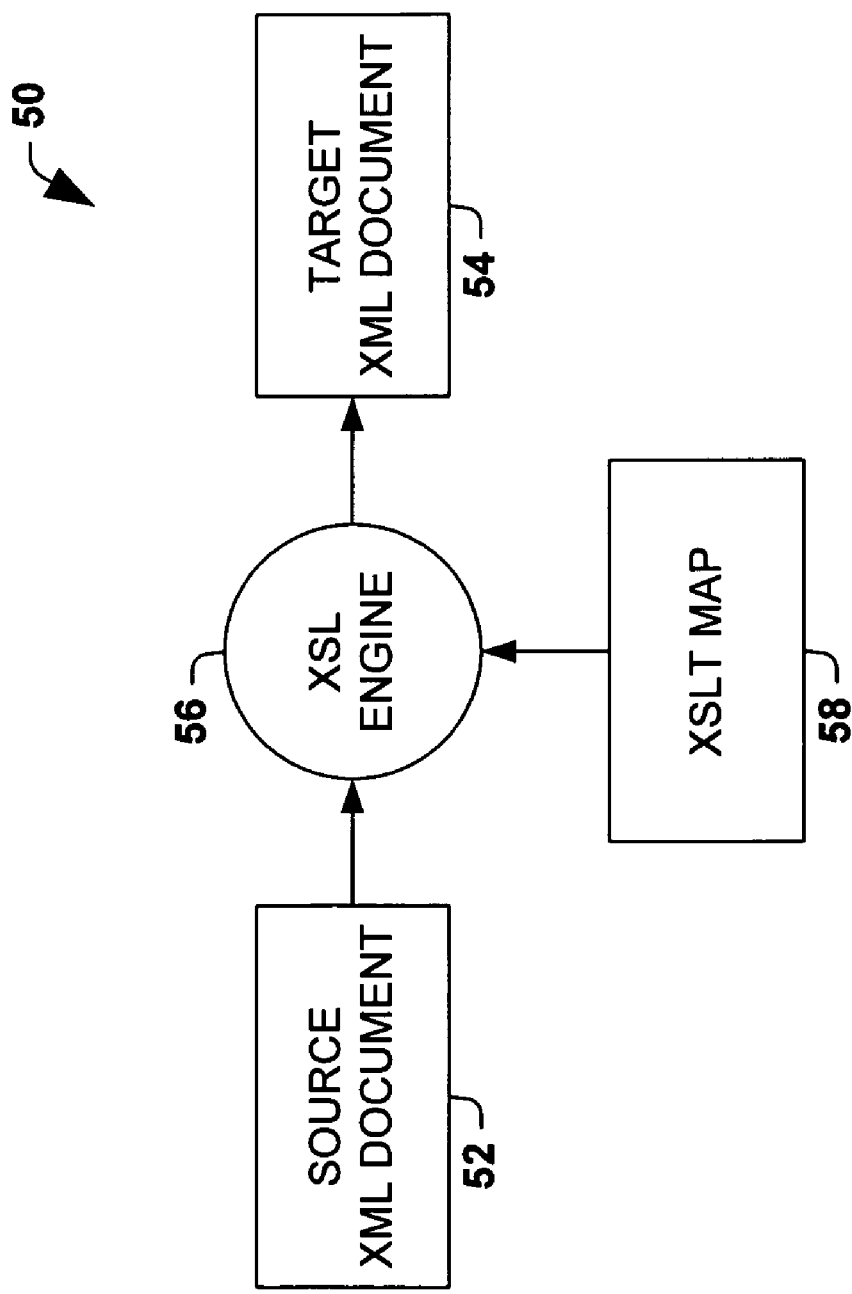
FIG. 3 is a schematic block diagram illustrating an XSL engine translating a source XML document into a target XML document according to an XSLT map created according to the invention.

Referring now to FIG. 3, an application of the invention is illustrated schematically, wherein a system 50 includes a source XML document 52, a target XML document 54, with an XSL engine 56 therebetween. The XSL engine 56 may comprise, for example, a computer system, which provides data transformations between the source XML document 52 and the target XML document 54 in accordance with an XSLT map 58 generated graphically in accordance with the invention. In this regard, the graphical user interface 20 of FIG. 2 may be used to create a mapping (not shown), which is then compiled into the computer executable instructions or codes, for example, XSLT code (e.g., map 58), and run by the engine 56 in performing the data transformation. Although the source and target documents 52 and 54 are illustrated as comprising XML information, the invention finds application with other forms of source and/or target information. Further in this regard, the output code may, but need not, be XSL or XSLT, whereby it will be appreciated that other output code languages fall within the scope of the invention.

The function object 2 of FIG. 1 (e.g., a COM object) abstracts the concept of a function call for the user of a graphical mapping tool user interface (e.g., interface 20). This allows a user to drag and drop abstracted functions (e.g., graphical components 8) into the mapping screen region 42 without the need to generate the computer-executable instructions associated therewith. The function object 2 may support any number of functions, for example by implementing a COM or other type interface.

Figure 4A:
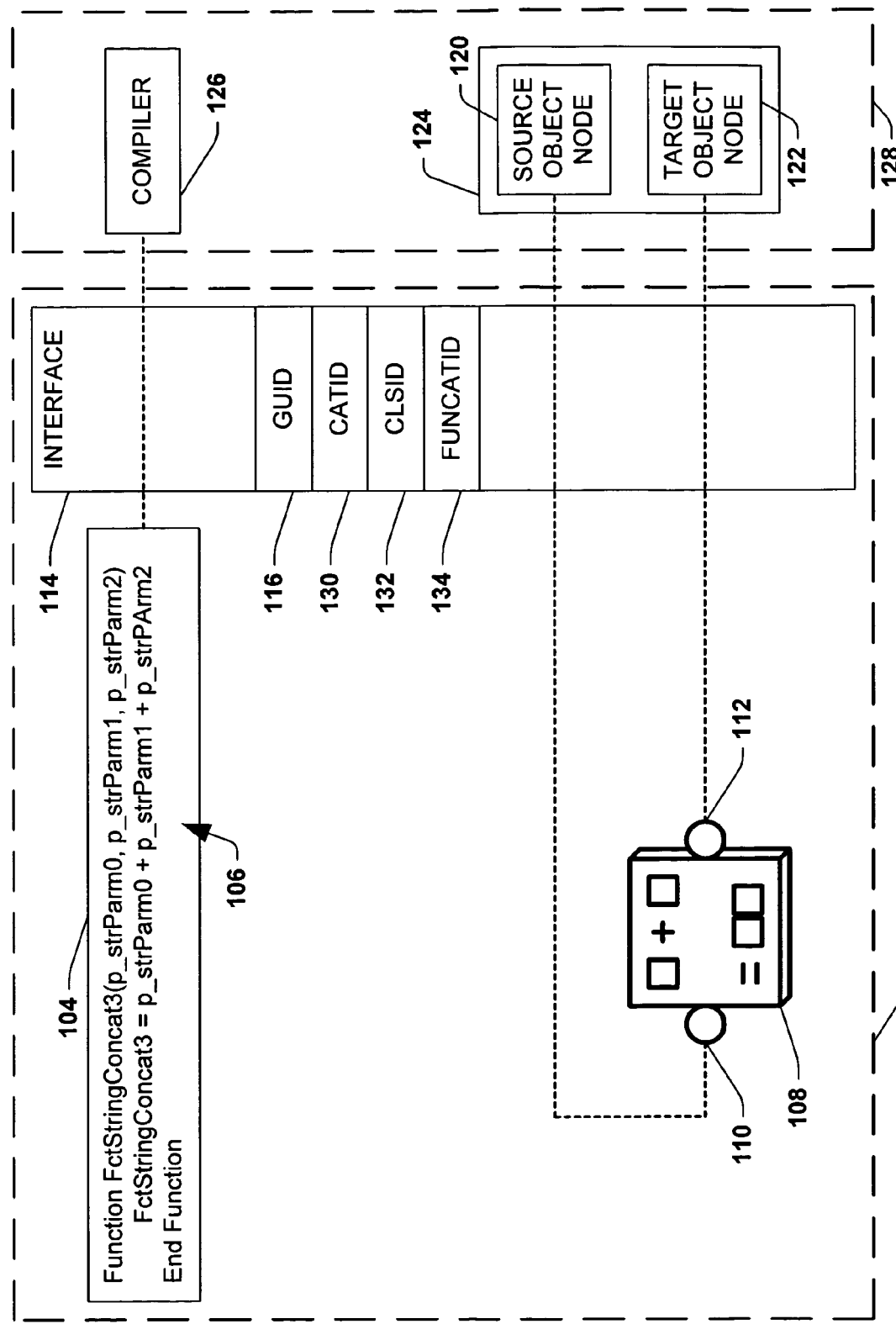
FIG. 4A is a schematic diagram illustrating an exemplary function object having an interface component providing a script component to a compiler and a graphical component to a graphical user interface according to the invention.

Referring now to FIG. 4A, an exemplary function object 100 is illustrated, having a script component 104 with computer-executable instructions 106 for performing a string concatenation function. The computer-executable instructions 106 may be, for example, basic, visual basic, VB script, C++, visual C++, java, java script, Perl, or any scripting language. The object 100 further comprises a graphical component 108 associated with the concatenation function, having an input 110 and an output 112. The input 110 and output 112 may be associated with one or more source object nodes 120, and one or more target object nodes 122, respectively, in a graphical user interface 124 via an interface component 114. The interface component 114 includes a globally unique identifier (GUID), and further provides the script component 104 to a compiler 126 in a mapping tool 128. The GUID 116 may be used to distinguish a particular function object (e.g., object 100) from other objects, whereby a mapping tool 128 may search for the object 100 in a function object source (e.g., a DLL file in a host computer or at an Internet website).

The interface component 114 may further include a category identifier component (CATID) 130, for example, to identify the object 100 as a function object for use in mapping creation, as opposed to another type of object. The CATID 130 may be, for example, IFunctoid, to indicate the interface 114 as providing access to such function object functionality. In addition, the interface component 114 may include a class identifier component (CLSID) 132 and a function category identifier component (FUNCATID) 134. The function category is associated with the function implemented in the computer-executable instructions 104 of the script component 104. As described in greater detail infra, the FUNCATID 134 may be used in association with function objects having a plurality of functions associated therewith to allow selective searching and displaying of the functions and graphical components associated therewith. For example, the FUNCATID may comprise one or more of string, mathematical logical, date, conversion, scientific, advanced, and custom function categories.

Figure 4B:
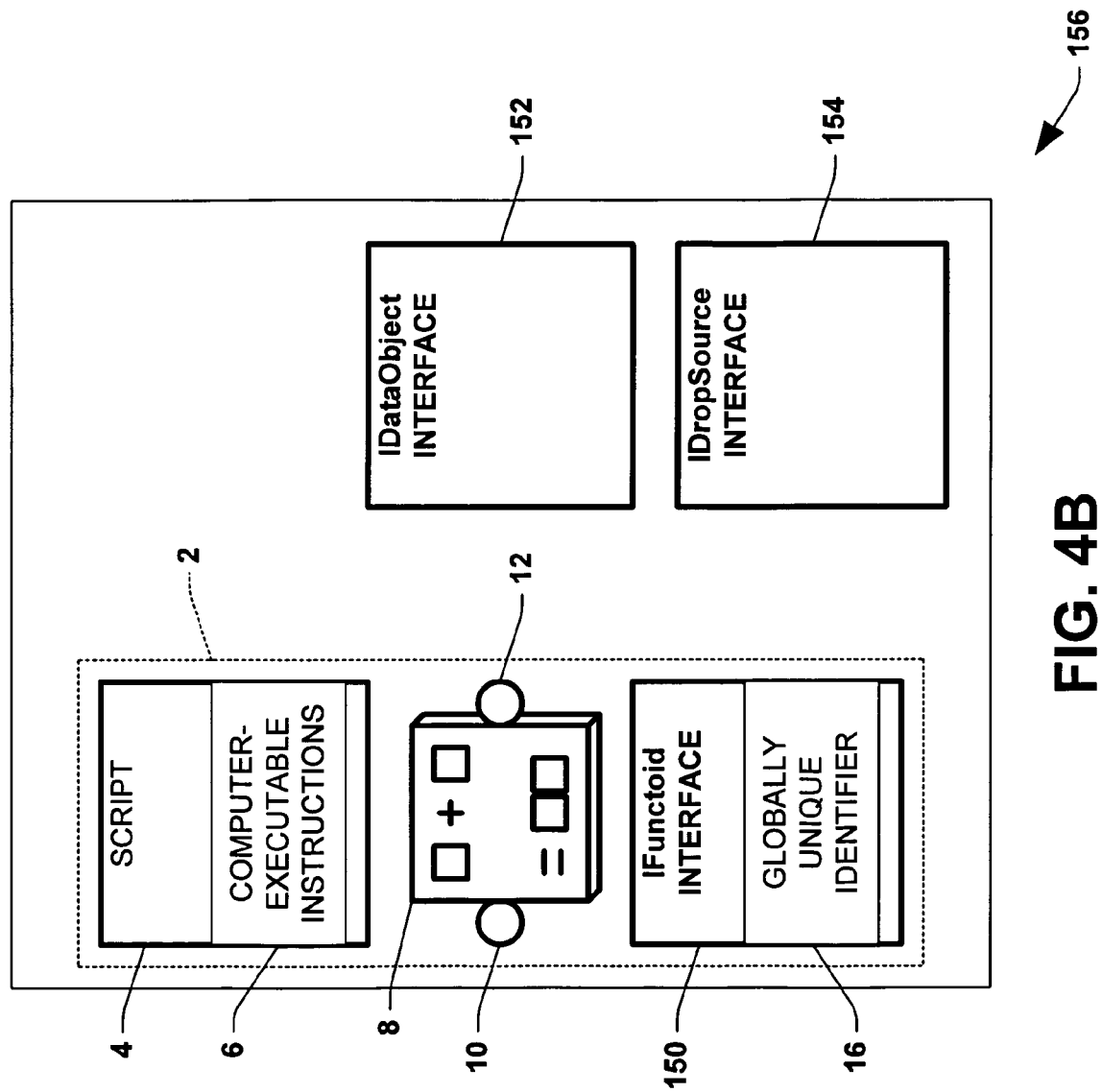
FIG. 4B is a schematic diagram illustrating another exemplary function object having a second interface component allowing drag and drop functionality according to the invention.

Turning now to FIG. 4B, the exemplary function object 2 of FIG. 1, supporting the IFunctoid interface 150, may be associated or aggregated with an IDataObject interface 152 and the IDropSource interface 154 in a wrapper object 156. A mapping tool (as illustrated and described in greater detail infra) may create the wrapper object 156 in order to allow a mapping tool graphical interface user to drag and drop the graphical component 8 from a function object palette (not shown) to a mapping screen region (e.g., region 42 of FIG. 2). Because the invention allows a user to create custom function objects, the mapping tool may be adapted to wrap the function objects (e.g., object 2) with the interfaces 152 and/or 154 at runtime. This provides drag and drop functionality used in the graphical user interface of a mapping tool to be implemented without requiring users to implement this functionality in each custom function object.

Figure 4C:
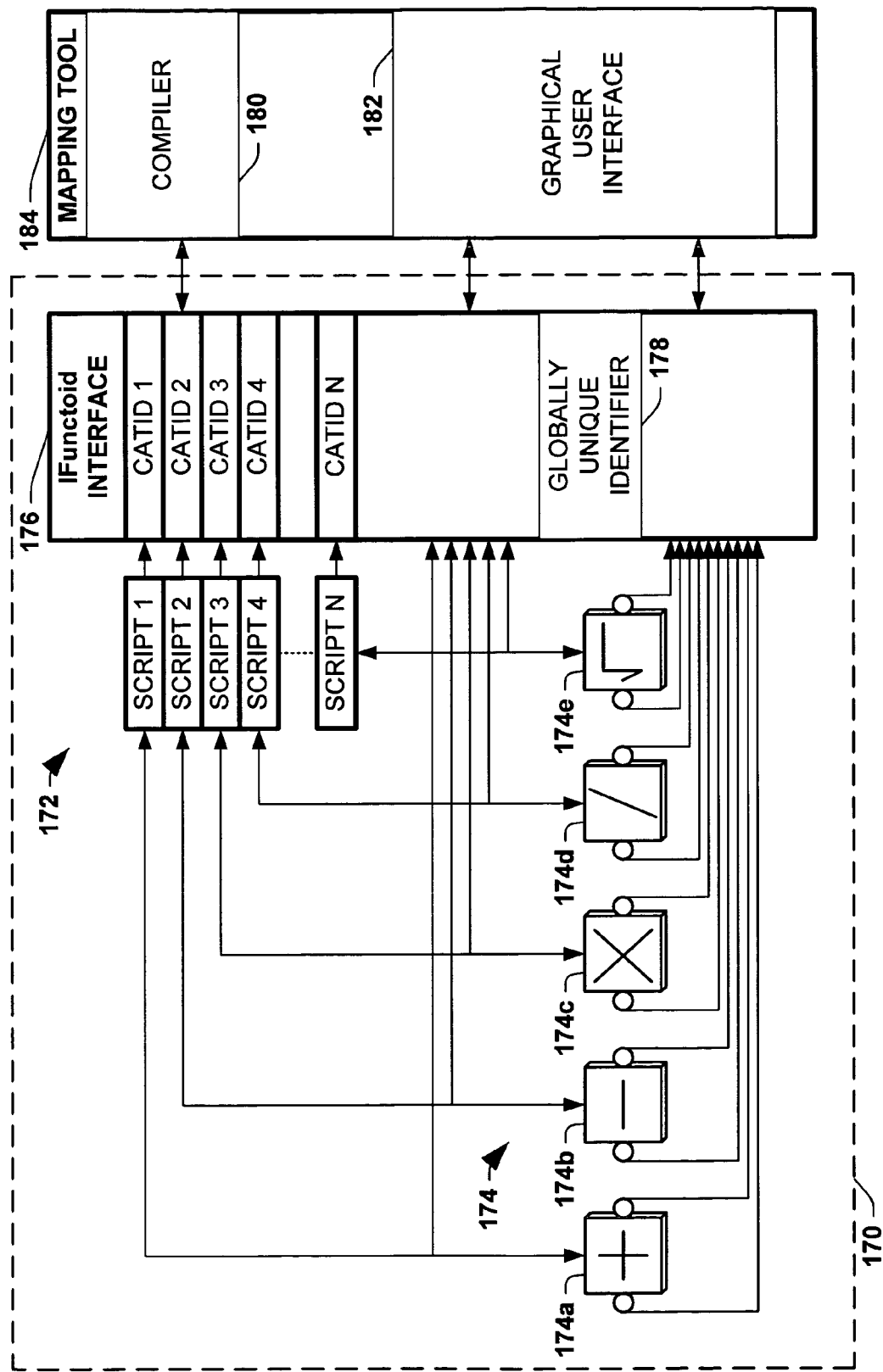
FIG. 4C is a schematic diagram illustrating a another exemplary function object having a plurality of functions associated therewith in accordance with the invention.

Referring also to FIG. 4C, another exemplary function object 170 is illustrated having a plurality of script components 172 including SCRIPT 1, SCRIPT 2, SCRIPT 3, SCRIPT 4, and SCRIPT N, where N is an integer. Associated with the plurality of script components 172 is a plurality of graphical components 174. The graphical components 174 are individually associated with one of the plurality of script components 172. For example, graphical component 174*b* is associated with SCRIPT 2. Script components 172 are further individually associated with a plurality of function category identifier components FUNCATID 1, FUNCATID 2, FUNCATID 3, FUNCATID 4, and FUNCATID N in an interface component 176. For example, the function category identifiers may comprise one or more of string, mathematical logical, date, conversion, scientific, advanced, and custom function categories.

The interface component 176 further comprises a globally unique identifier component 178. Interface component 176 may provide one or more of the plurality of script components 172 to a compiler 180 and the plurality of graphical components 174 to a graphical user interface 182 of a mapping tool 184. In this way, one function object 170 may provide a plurality of functionality choices for a user creating a mapping with a mapping tool graphical user interface 182.

Figure 5A:
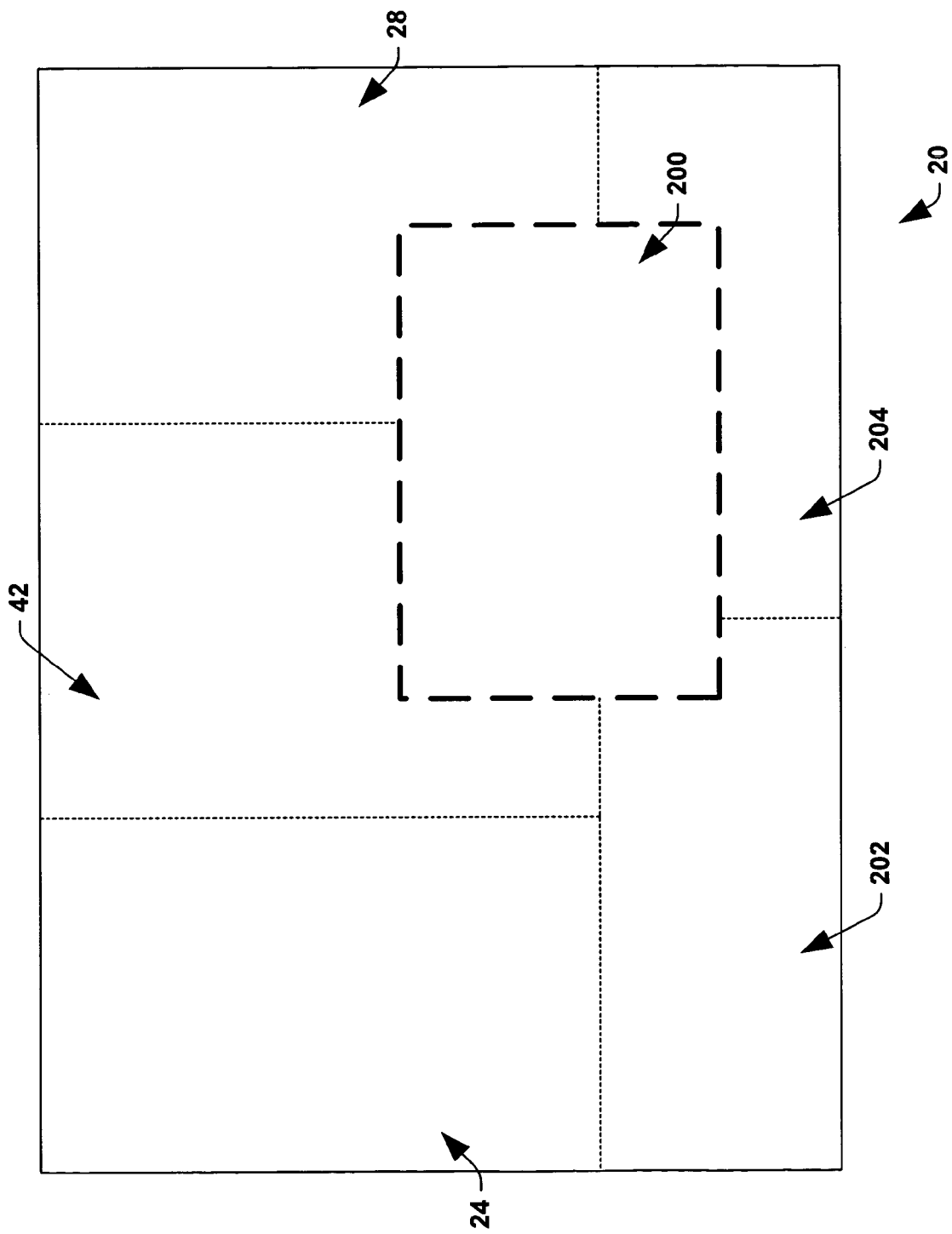
FIG. 5A is a front elevation view of an exemplary graphical user interface having a palette screen region according to the invention.
Figure 5B:
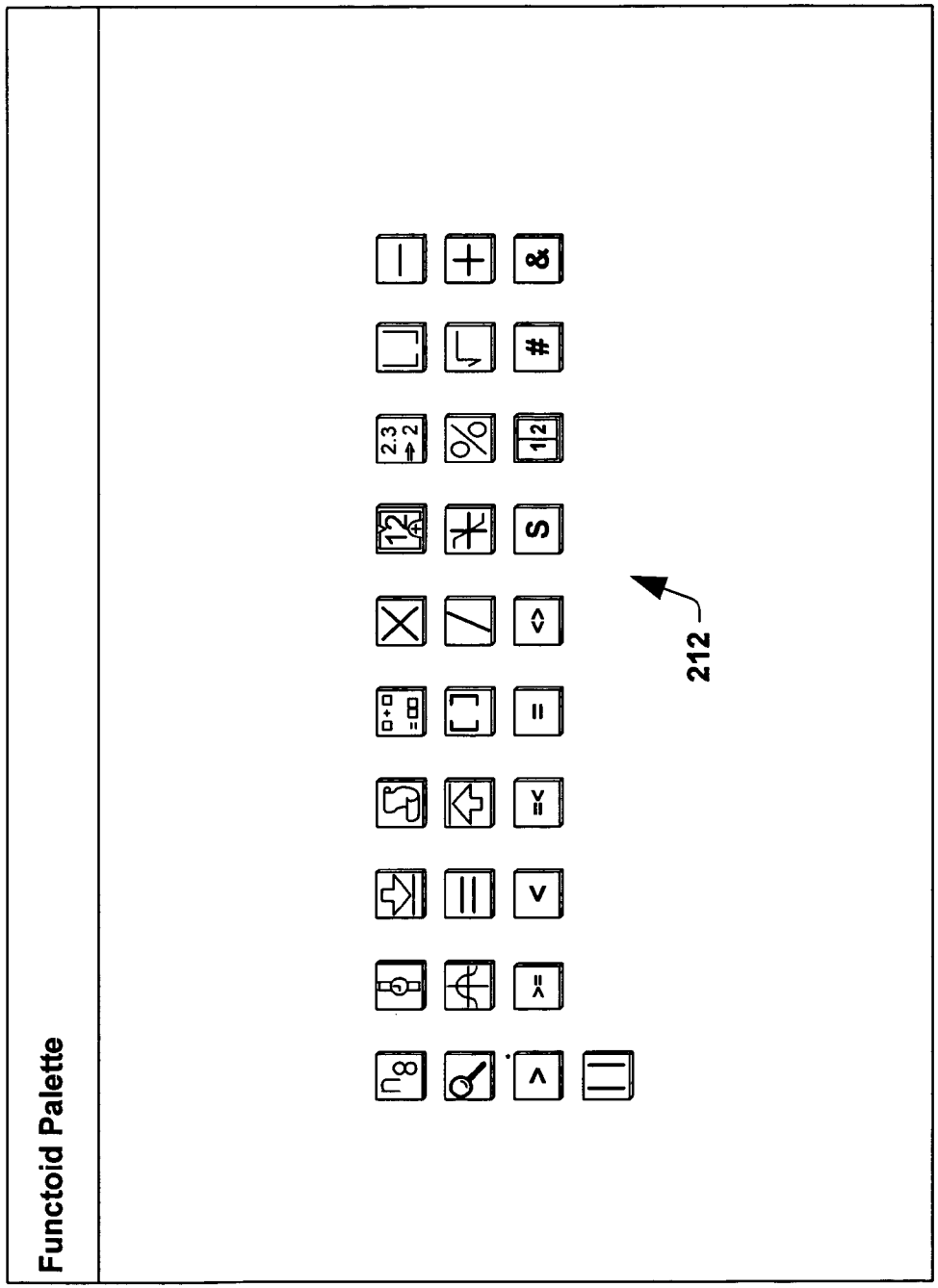
FIG. 5B is a front elevation view of an exemplary function object palette screen according to another aspect of the invention.

Referring now to FIGS. 5A through 5D, the exemplary mapping tool graphical user interface 20 of FIG. 2 is illustrating including source screen region 24, target screen region 28, and mapping screen region 42. The interface 20 may further comprise a function object palette region 200, as well as regions 202 and 204 for providing information related to selected source and target nodes in regions 24 and 28, respectively. As illustrated in FIG. 5B, an exemplary function object palette 210 may be displayed in the function object palette region 200 of the interface 20, including a plurality of function object graphical components 212. According to another aspect of the invention, the mapping tool may be adapted to display the function object palette 210 in the region 200 of interface 20, display at least one of the plurality of function object graphical components 212 on the palette 210, and allow a user to drag and drop one or more of the graphical components 212 onto the mapping screen region 42 in creating a mapping (e.g., mapping 44 of FIG. 2). In this regard, the mapping tool may be further adapted to wrap function objects (e.g., function object 2) with other interfaces in a wrapper object (e.g., object 150 of FIG. 4B) in order to facilitate the drag and drop functionality, as illustrated and described supra.

Figure 5C:
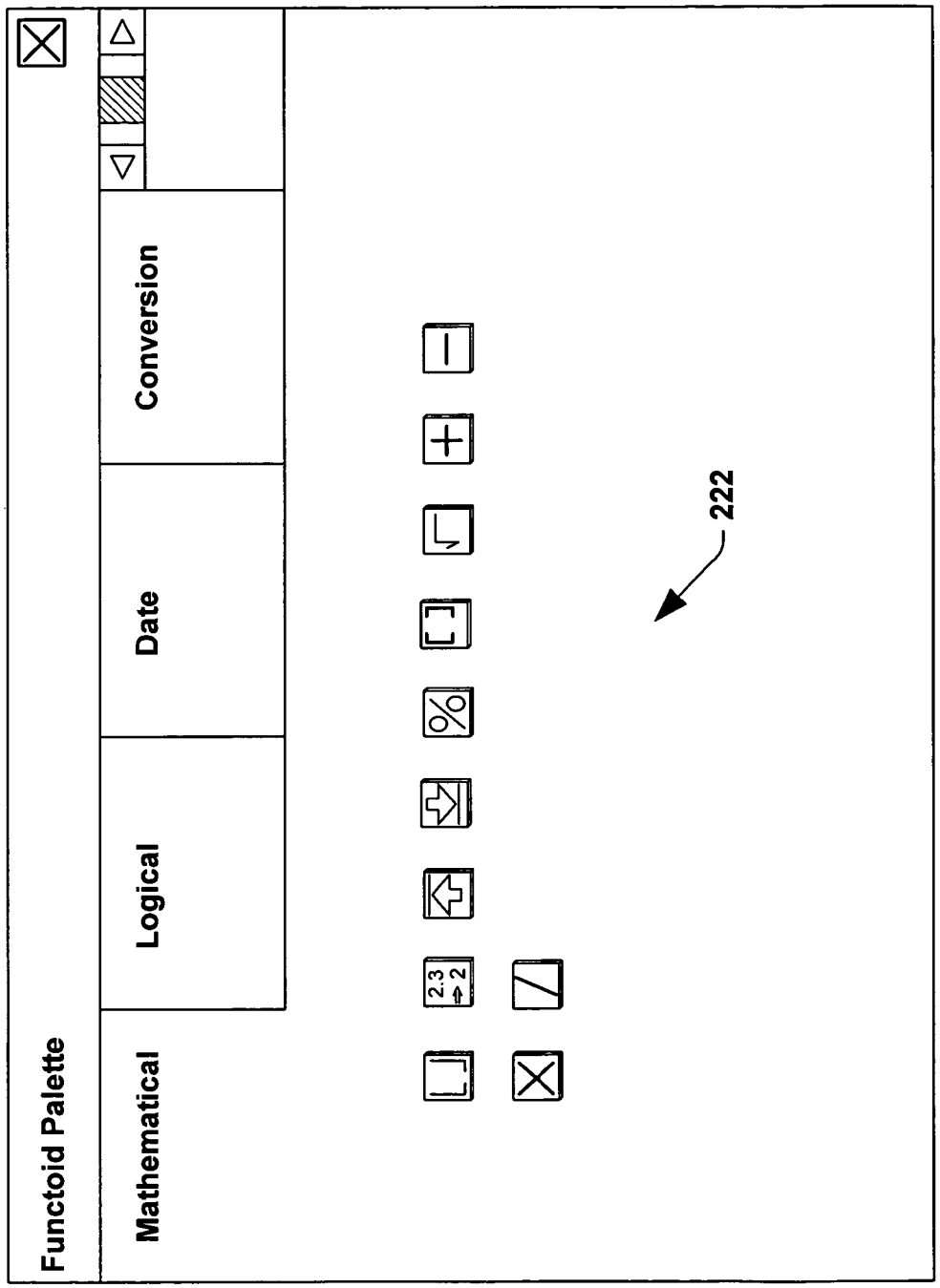
FIG. 5C is a front elevation view of another exemplary function object palette screen having a grouping of mathematical function objects.
Figure 5D:
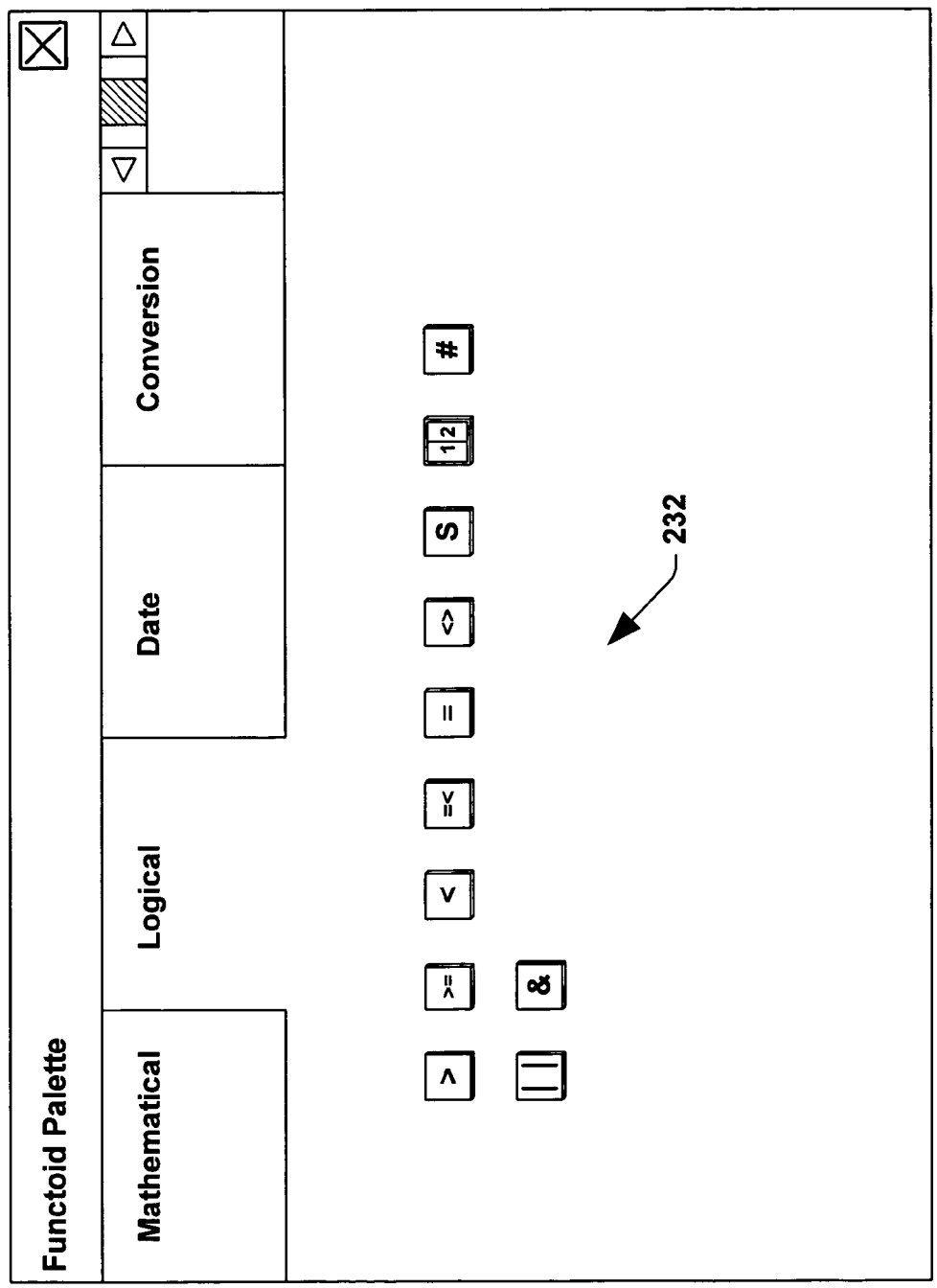
FIG. 5D is a front elevation view of another exemplary function object palette screen having a grouping of logical function objects.

Referring also to FIGS. 5C and 5D, the function object palette region 200 may further include a plurality of function object palette screens organized by function object category (e.g., FUNCATID of FIGS. 4A and 4C). Thus, a user may be presented with a mathematical function object palette 220 having displayed therein a plurality of mathematical function object graphical components 222 (e.g., where the associated FUNCATID is "mathematical") as shown in FIG. 5C. Further in this regard, the user may be presented with a logical function object palette 230 having displayed therein a plurality of logical function object graphical components 232 (e.g., where the associated FUNCATID is "logical") as shown in FIG. 5D. Many categories of function objects are possible within the scope of the present invention, for example, mathematical logical, date, conversion, scientific, advanced, and custom function categories.

Figure 6A:
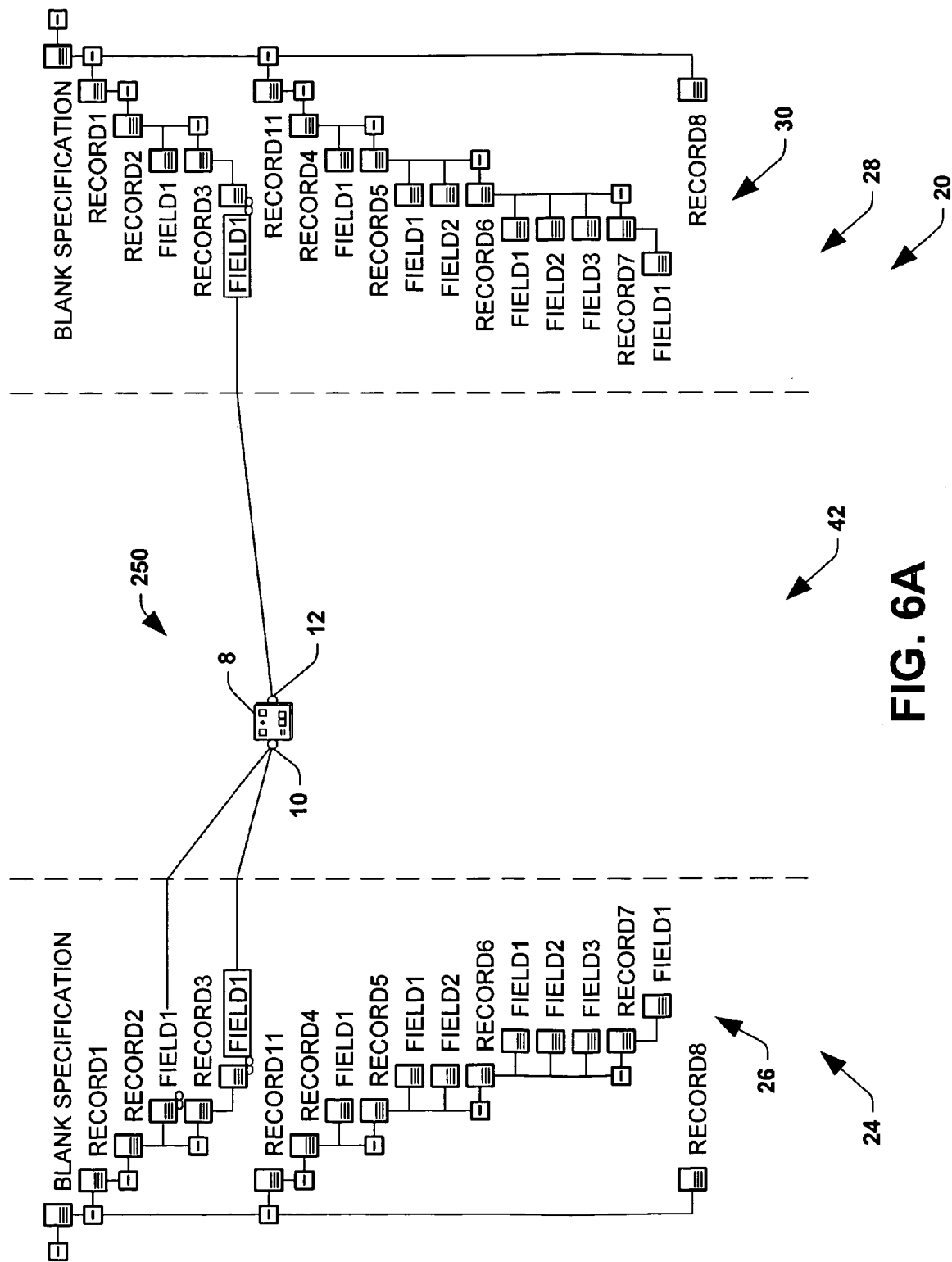
FIG. 6A is a front elevation view of an exemplary function object graphical component employed in a mapping according to the invention.
Figure 6B:
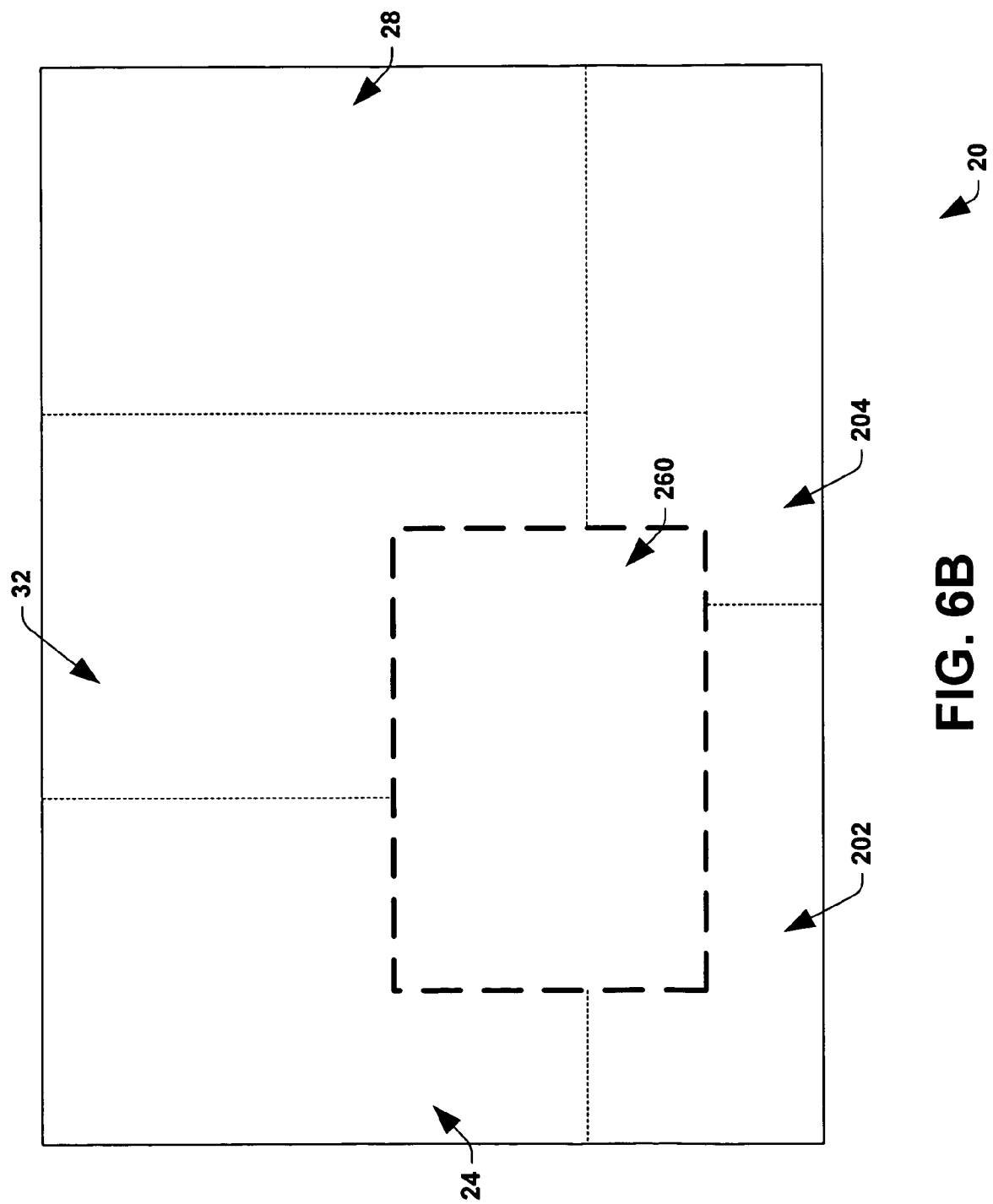
FIG. 6B is a front elevation view of a graphical user interface having a function object properties page region according to the invention.
Figure 6D:
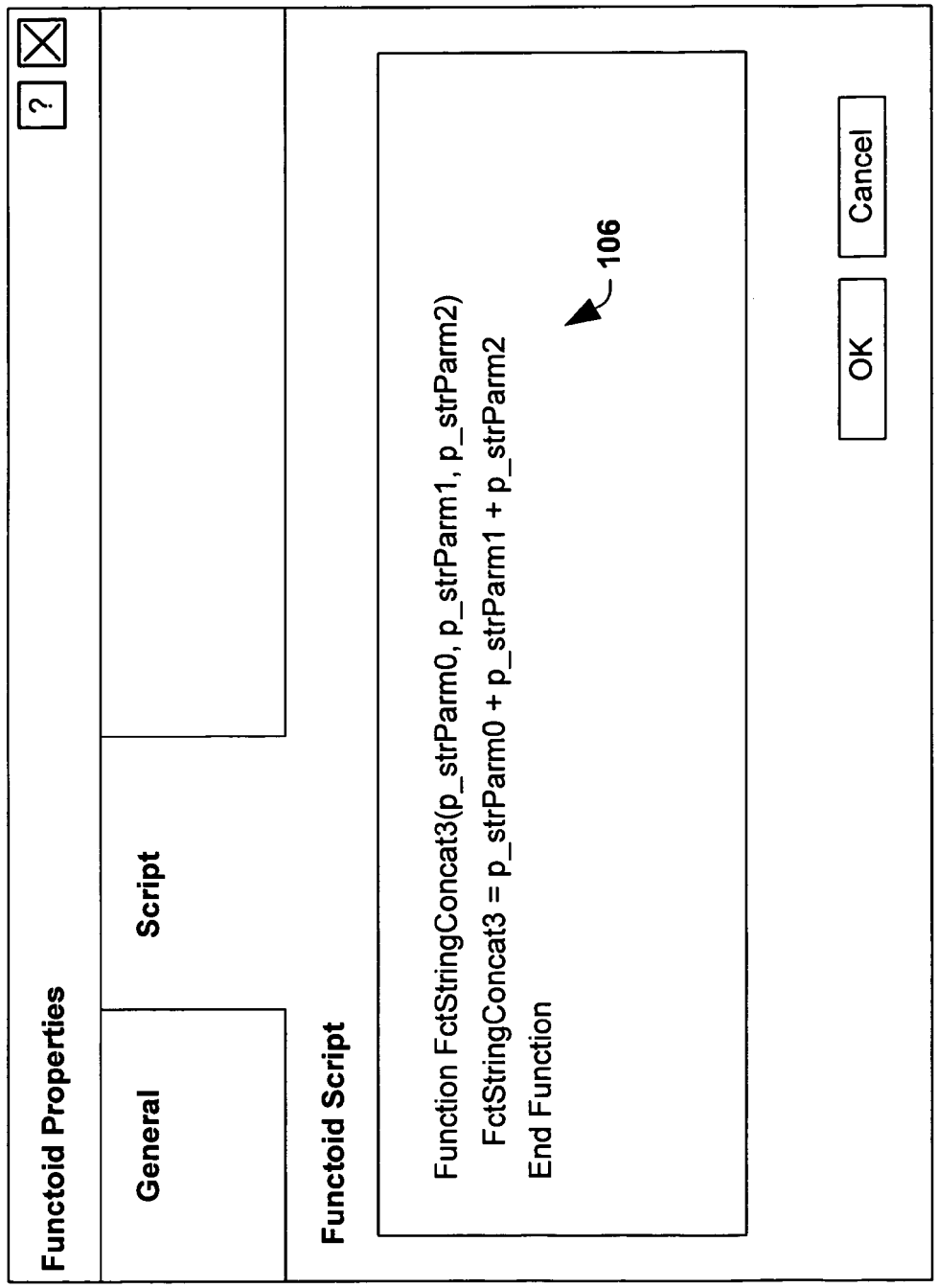
FIG. 6D is a front elevation view of another exemplary function object properties page having computer-executable script instructions according to the invention.

Referring now to FIGS. 6A through 6D, another exemplary mapping 250 is illustrated in region 42 of the mapping tool graphical user interface 20, including the exemplary string concatenation function object graphical component 8. The input 10 of the graphical component 8 is associated with two nodes in the source object 26 and the output 12 is associated with a node in the target or destination object 30. The interface 20 may further include a function object properties page region 260 in which function object parameters (e.g., input associations, values, etc.) may be displayed on a function object parameters page 262 (FIG. 6C), and associated computer-executable instructions (e.g., string concatenation instructions 106) may be displayed in a script page 264 (FIG. 6D). The pages 262, and 264 may be further adapted to allow a user to modify properties and/or computer-executable instructions associated with a particular function object. This allows a user to create custom function objects by modifying existing function objects. As discussed infra, a user may further create custom function objects from scratch by providing function information to a mapping tool or other function object creation tool.

Figure 7A:
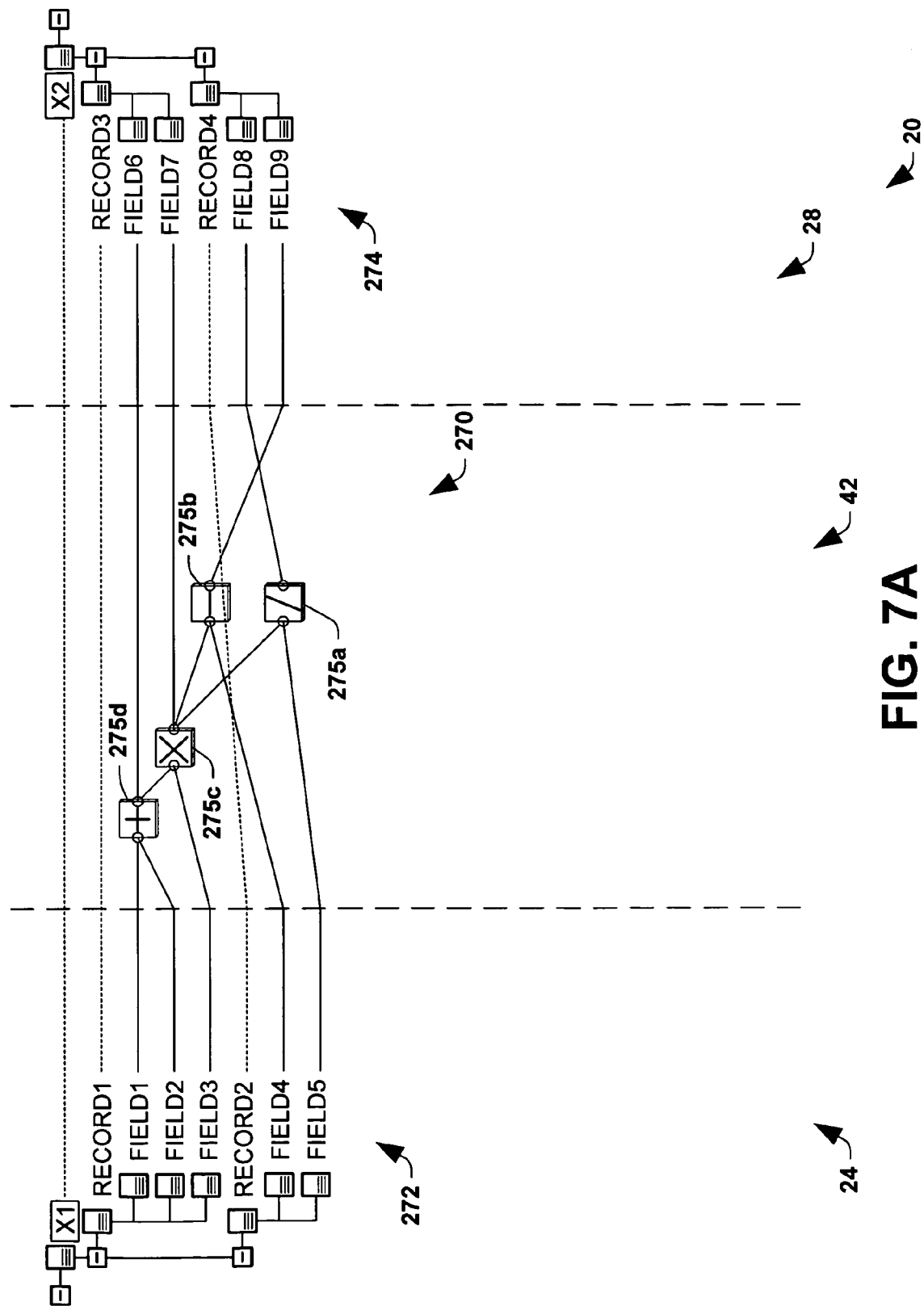
FIG. 7A is a front elevation view of another exemplary mapping employing function objects according to the invention.

Referring also to FIGS. 7A through 7C, another exemplary mapping 270 is illustrated in region 42 of interface 20, between a source object 272 in region 24 and a target object 274 in region 28. The mapping 270 comprises links (not numerically designated) as well as function object graphical components 275a, 275b, 275c, and 275d (collectively referred to as 275). Interface 20 may also comprise a mapping tool compiler component (not shown) adapted to generate compiled output code for the mapping 270. The interface 20 may include an output code screen region 276 for displaying an output code screen or page 278, as illustrated in FIG. 7C. The output code page 278 displays compiled output mapping code 280 including the computer-executable script instructions associated with the function object graphical components 275 in the mapping 270.

Figure 8:
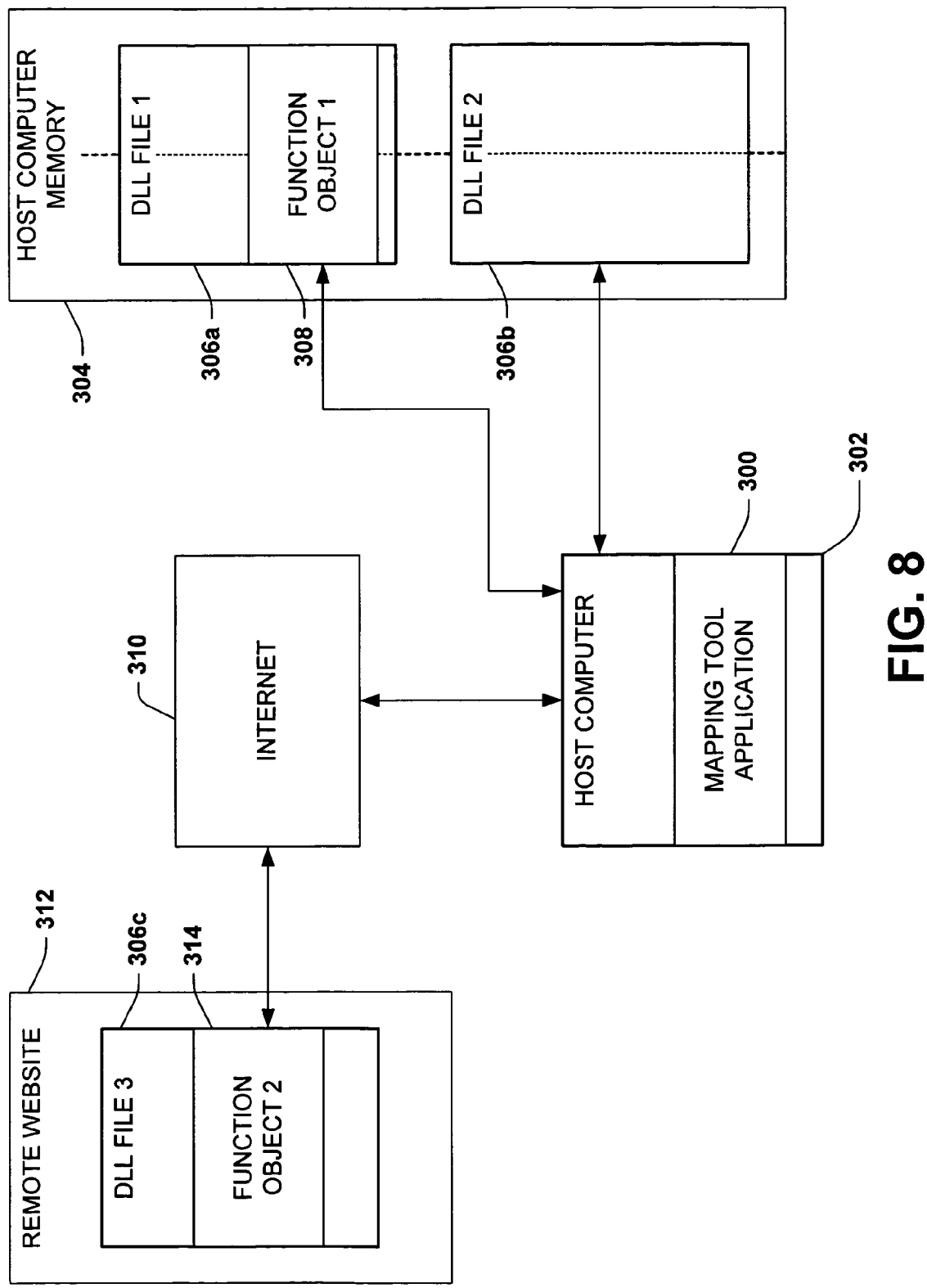
FIG. 8 is a schematic diagram illustrating an exemplary system in which a mapping tool may obtain a function object from a variety of sources according to the invention.

Referring now to FIGS. 8 and 2, another aspect of the invention is illustrated. A mapping tool application 300 having a graphical user interface (e.g., interface 20) is resident in a host computer 302. The mapping tool 300 is adapted to provide one or more function objects (e.g., function object 2 of FIG. 1) and to display the graphical components thereof in the user interface 20 (e.g., via a function object palette 210 in region 200). A user (not shown) may create a mapping (e.g., mapping 44 of FIG. 2) in the interface 20 by associating source object nodes with target object nodes using links (e.g., links 46 of FIG. 2) and function object graphical components (e.g., components 8). The mapping tool 300 may further comprise a compiler (e.g., compiler 180 of FIG. 4C) adapted to generate compiled output code according to the mapping and including computer-executable instructions from the script component of the function objects in the mapping.

The host computer 302 includes a memory 304, which may contain one or more dynamic link library (DLL) files 306. For example, DLL file 306a in host computer memory 304 may include a function object 308, while DLL file 306b does not. In providing a function object to the graphical user interface 20, the mapping tool 300 may search some or all DLL files 306 in the host computer memory 304, identify the function object 308 in DLL file 306a, and load the object 308 into the mapping tool 300 for access by a user via the graphical user interface 20. The mapping tool may search the memory 304 in this fashion at startup according to a startup script (not shown) in the mapping tool application 300, or according to a user command (e.g., when a user opens a function object palette 210 in region 200 of interface 20). In this way, the mapping tool 300 provides access to all function objects available in the host computer 302.

The host computer may further provide the mapping tool application with access to the internet 310, whereby the mapping tool 300 may access a remote website 312. Upon startup, or upon a user command, the mapping tool 300 may search the website 312 for DLL files including one or more function objects for use in creating a mapping. For example, the website 312 may include a DLL file 306c having a function object 314 therein. The mapping tool may then download the DLL file 306c or otherwise provide access to the function object 314 to the user interface 20. Mapping tool 300 may further perform searches of many such websites, including a site address provided by the user. In this way, a user may incorporate function objects from various sources into a mapping in region 42 of interface 20, allowing the dissemination of such function objects to many users.

Figure 9A:
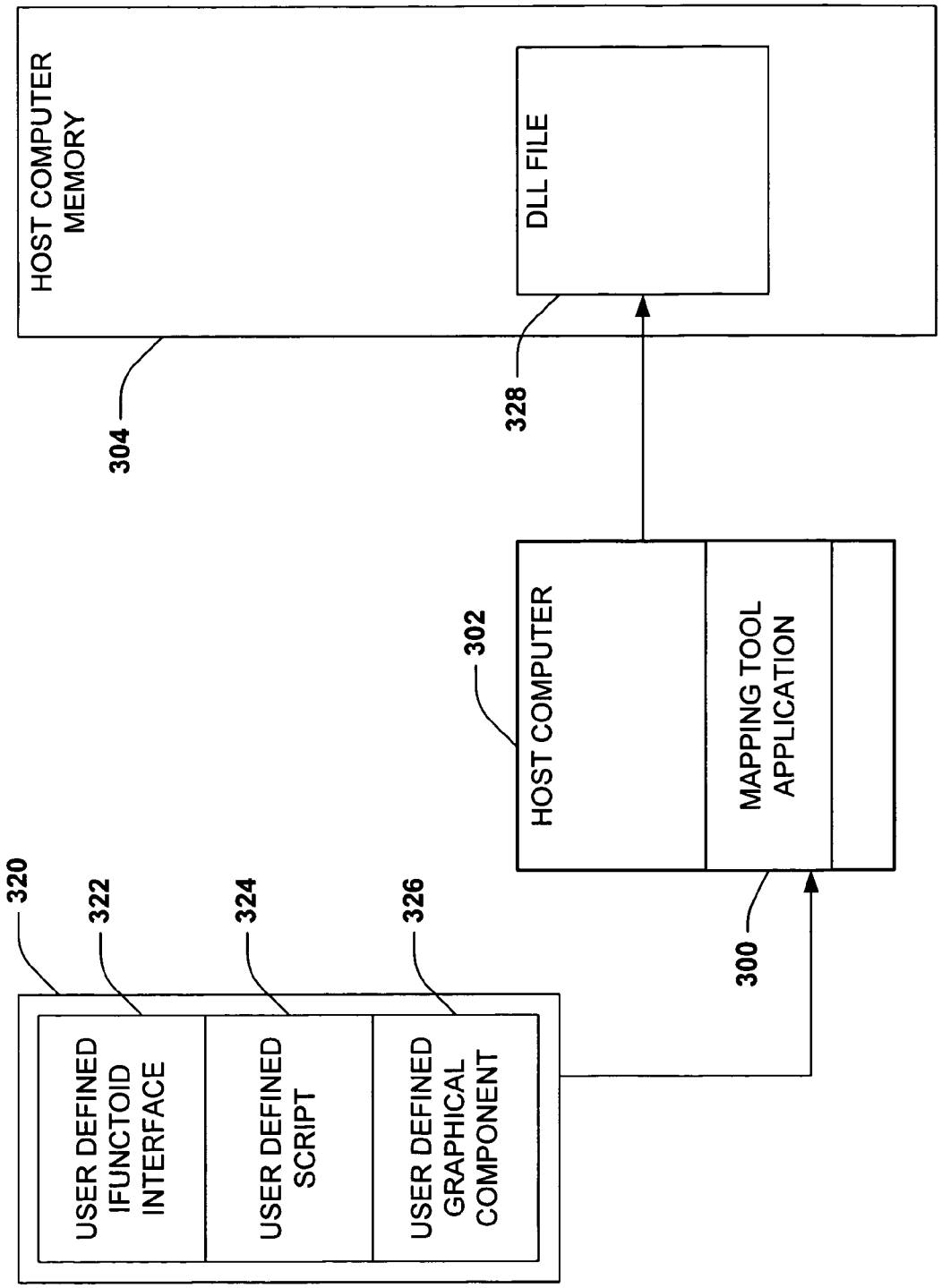
FIG. 9A is a schematic diagram illustrating a system in which a function object may be created according to the invention.
Figure 9B:
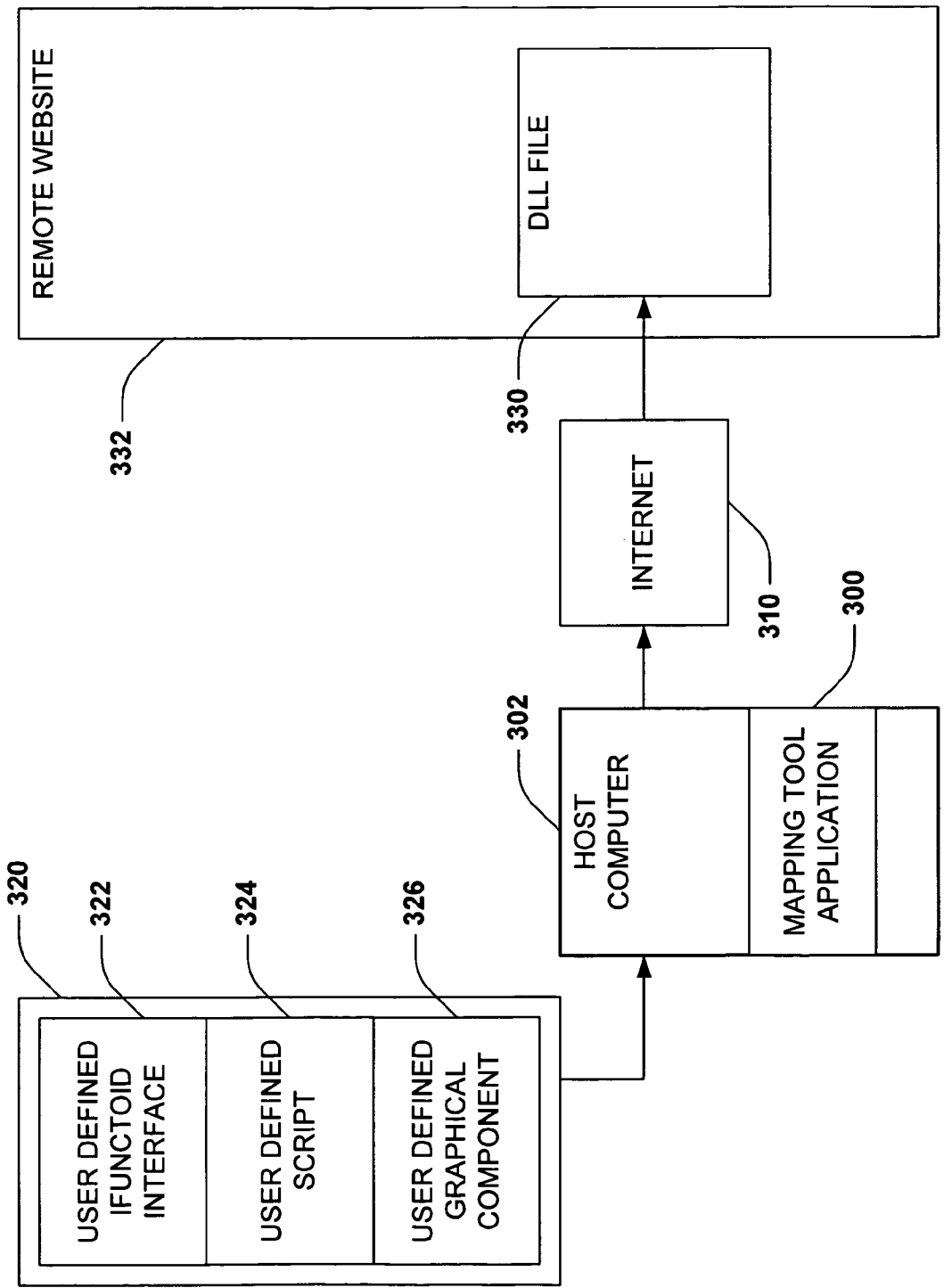
FIG. 9B is a schematic diagram illustrating another system in which a function object may be created according to the invention.
Figure 9C:
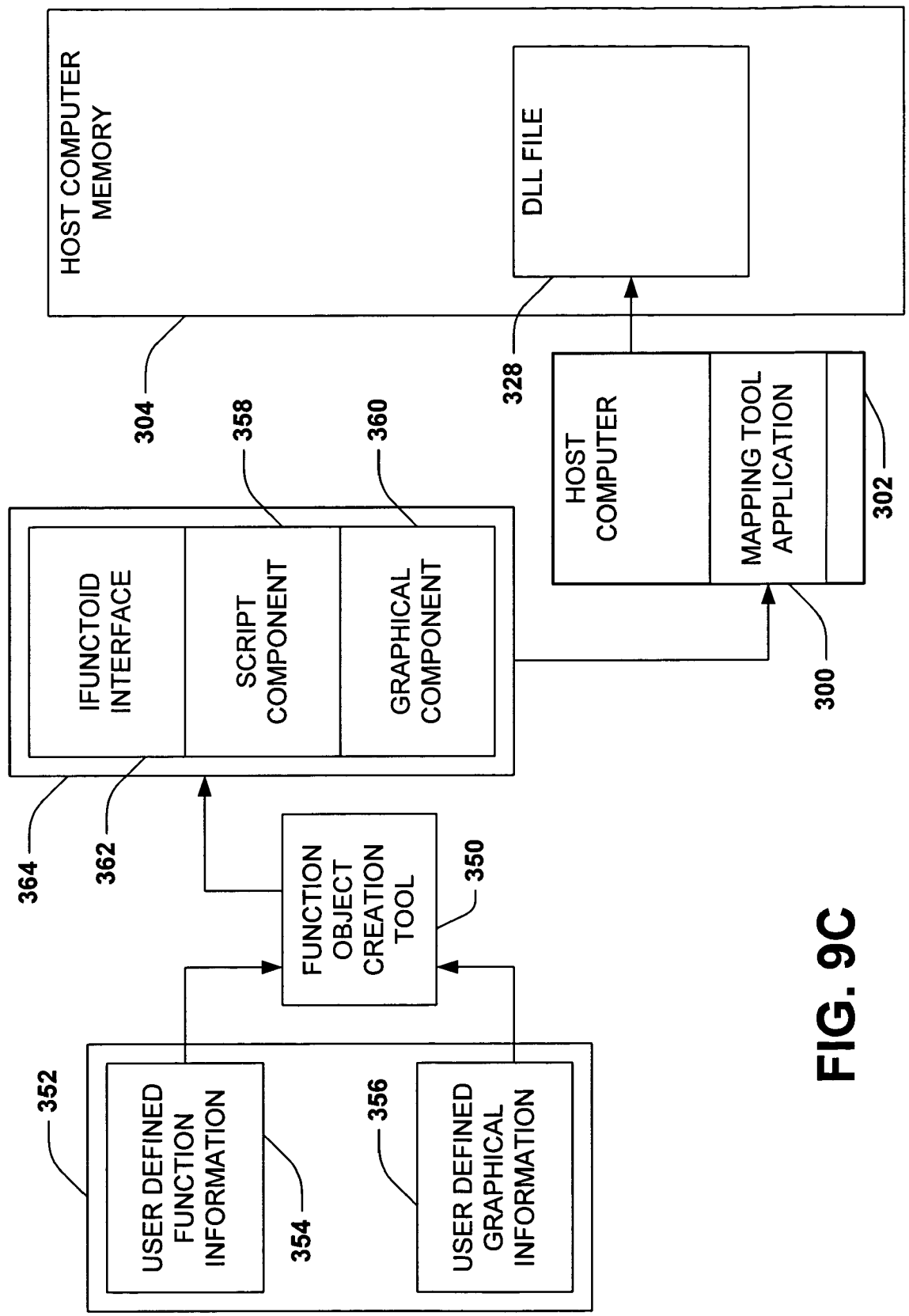
FIG. 9C is a schematic diagram illustrating an exemplary tool for creating a function object according to the invention.

Referring now to FIGS. 9A through 9C, a user may provide a custom function object 320 to the mapping tool 300 in accordance with another aspect of the invention. The user may create a user-defined IFunctoid interface component 322, a user-defined script component 324, and a user-defined graphical component 326 to the mapping tool application 300, which may then be used in creating mappings via a user interface 20. The mapping tool may store the custom function object 320 in a DLL file 328 in the host computer memory 304, whereby the function object 320 may be used in subsequent mapping creation sessions. Referring also to FIG. 9B, the mapping tool 300 may alternatively or additionally store the custom function object 320 in a DLL file 330 at a remote website 332 via the Internet 310 or other network.

Referring now to FIG. 9C, the invention further comprises a function object creation tool 350, which may, but need not be, included in the mapping tool 300. The tool 350 allows an unsophisticated user to provide a text file 352, including user-defined function information 354 and/or user-defined graphical information 356, from which the tool creates a function object script component 358 and/or graphical component 360. The tool 350 creates a function object interface component 362, and associates the components 358, 360, and 362 to create a user-defined function object 364. The mapping component may then store the function object 364 in a DLL file 328 in the memory 304 of the host computer 302, or in a DLL file on an Internet website (e.g., DLL file 330 on website 332).

In this manner, a user unfamiliar with the creation of interface components 362, script components 358 and/or graphical components 360 may easily create a function object via the creation of a text file with function and/or graphical information. While the file 352 may be a text file, other file types are possible within the scope of the invention. It will be appreciated that the function object creation tool 350 may reside in the mapping tool application 300 and/or at an Internet website. Thus, users may access a website (e.g., where existing function objects are stored), and create new function objects. It will further be appreciated that users may modify existing function objects, for example, via function object properties pages 262 and/or 264 in user interface region 260, as illustrated and described supra with respect to FIGS. 6A through 6D. Moreover, it will be understood that the function object creation tool 350 may prompt a user for information relating to the function object via a series of prompt screens and/or a wizard (not shown).

Figure 10A:
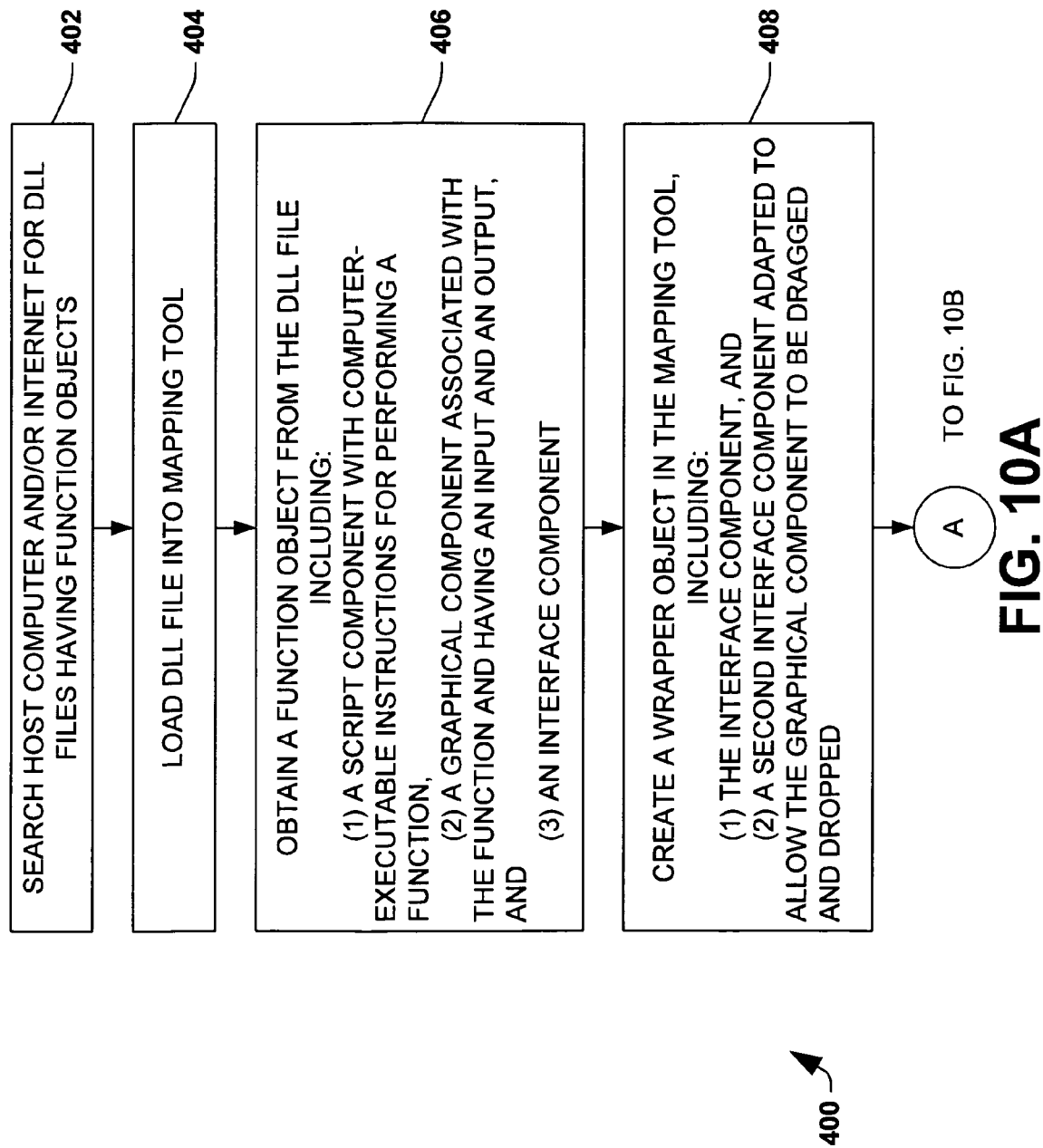
FIG. 10A is a flow diagram illustrating an exemplary method of creating a mapping in accordance with another aspect of the present invention.
Figure 10B:
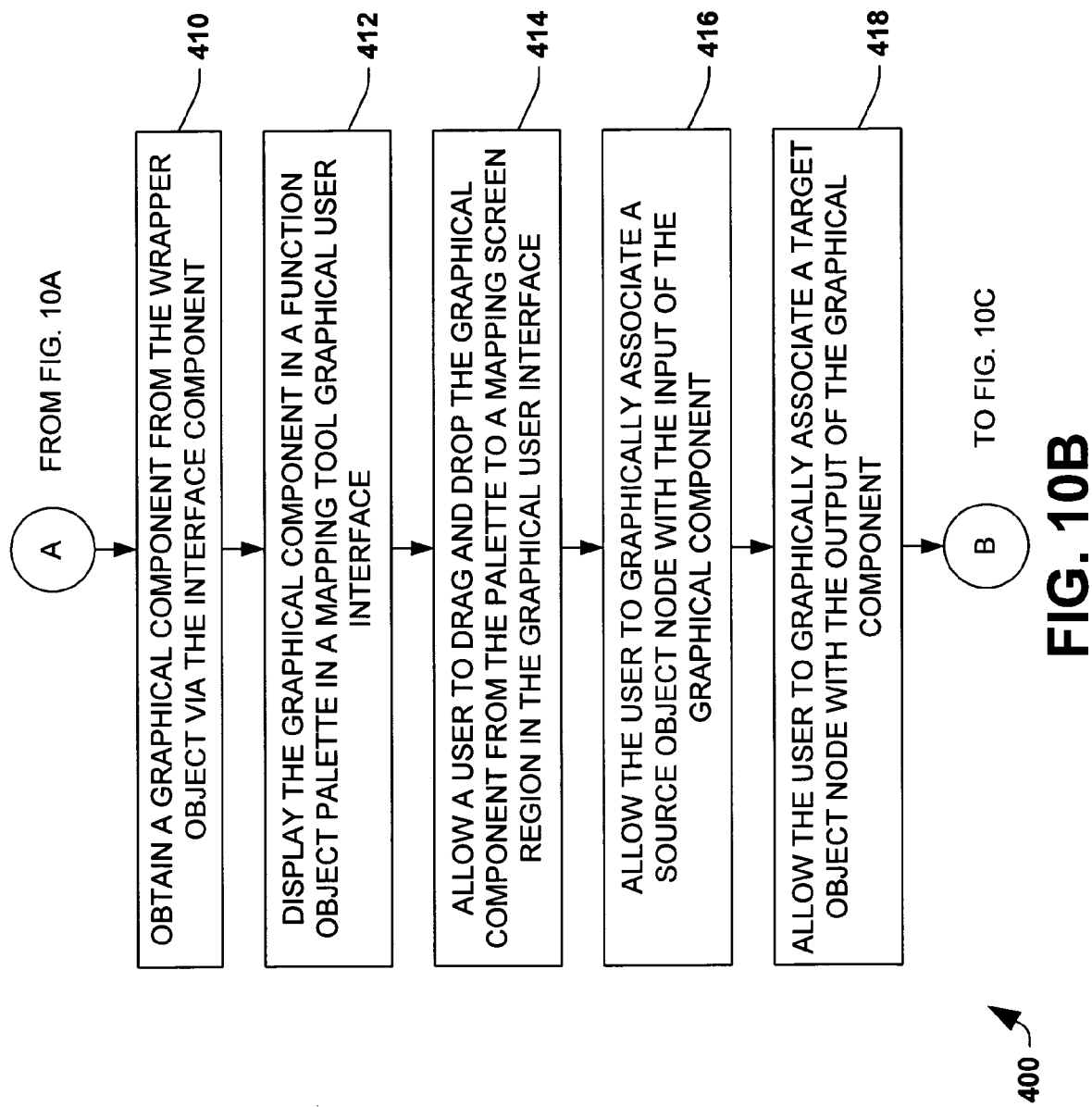
FIG. 10B is a flow diagram further illustrating the method of FIG. 10A.
Figure 10C:
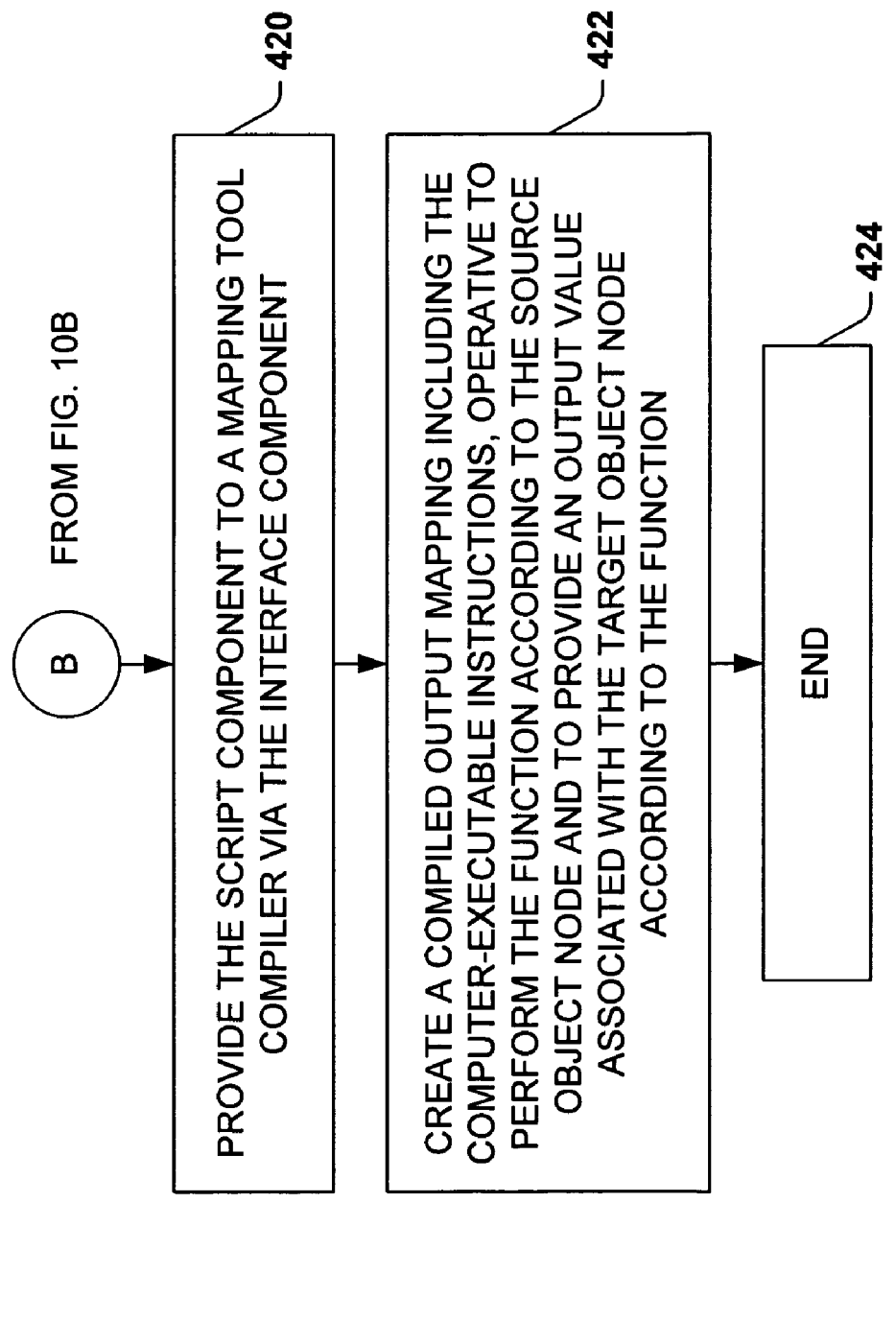
FIG. 10C is a flow diagram further illustrating the method of FIGS. 10A and 10B.

Referring now to FIGS. 10A through 10C, an exemplary method 400 of creating a mapping between a source object and a target object is illustrated. It will be appreciated that the method 400 may be implemented in the systems and tools described supra, and further that the method 400 may be practiced in other systems not illustrated. Beginning at step 402, a mapping tool (e.g., tool 300) searches a host computer (e.g., computer 302) for DLL files having function objects. At step 404, the identified DLL file (e.g., file 306a of memory 304) is loaded into the mapping tool. Thereafter at step 406, the tool obtains a function object (e.g., object 308) from the DLL file, which includes a script component, a graphical component, and an interface component. At step 408, the tool creates a wrapper object (e.g., object 156 of FIG. 4B) including the interface component and a second interface component adapted to allow the graphical component or components to be dragged and dropped in a mapping screen region (e.g., mapping screen region 42 of mapping tool graphical user interface 20).

Continuing a step 410 of FIG. 10B, the tool then obtains a graphical component from the wrapper object via the interface component, and displays the graphical component in a function object palette (e.g., palette 210 of FIG. 5B) in a mapping tool graphical user interface (e.g., interface 20) at step 412. Thereafter, the tool allows a user to drag and drop the graphical component from the palette to a mapping screen region (e.g., region 44) in the graphical user interface at step 414. At step 416, the user is allowed to graphically associate a source object node with the input of the graphical component (e.g., via links 46), and at step 418, the user may associate a target object node with the output of the graphical component.

At step 420 of FIG. 10C, the script component of the function object is provided to a mapping tool compiler via the interface component. Thereafter, at step 422, a compiled output mapping is created (e.g., via mapping tool compiler 126 of FIG. 4A), including the computer-executable instructions from the function object script component. The output code is operative to perform the function associated with the graphical component according to the source object node, and to provide an output value associated with the target object node according to the function. The method 400 thus provides significant advantages over convention methodologies, which required a user to create custom script code for mapping source and target documents or objects. The present invention thus provides a rich graphical mapping environment in which a user may easily employ function objects without need to understand the underlying computer-executable script instructions associated therewith.

Figure 11:
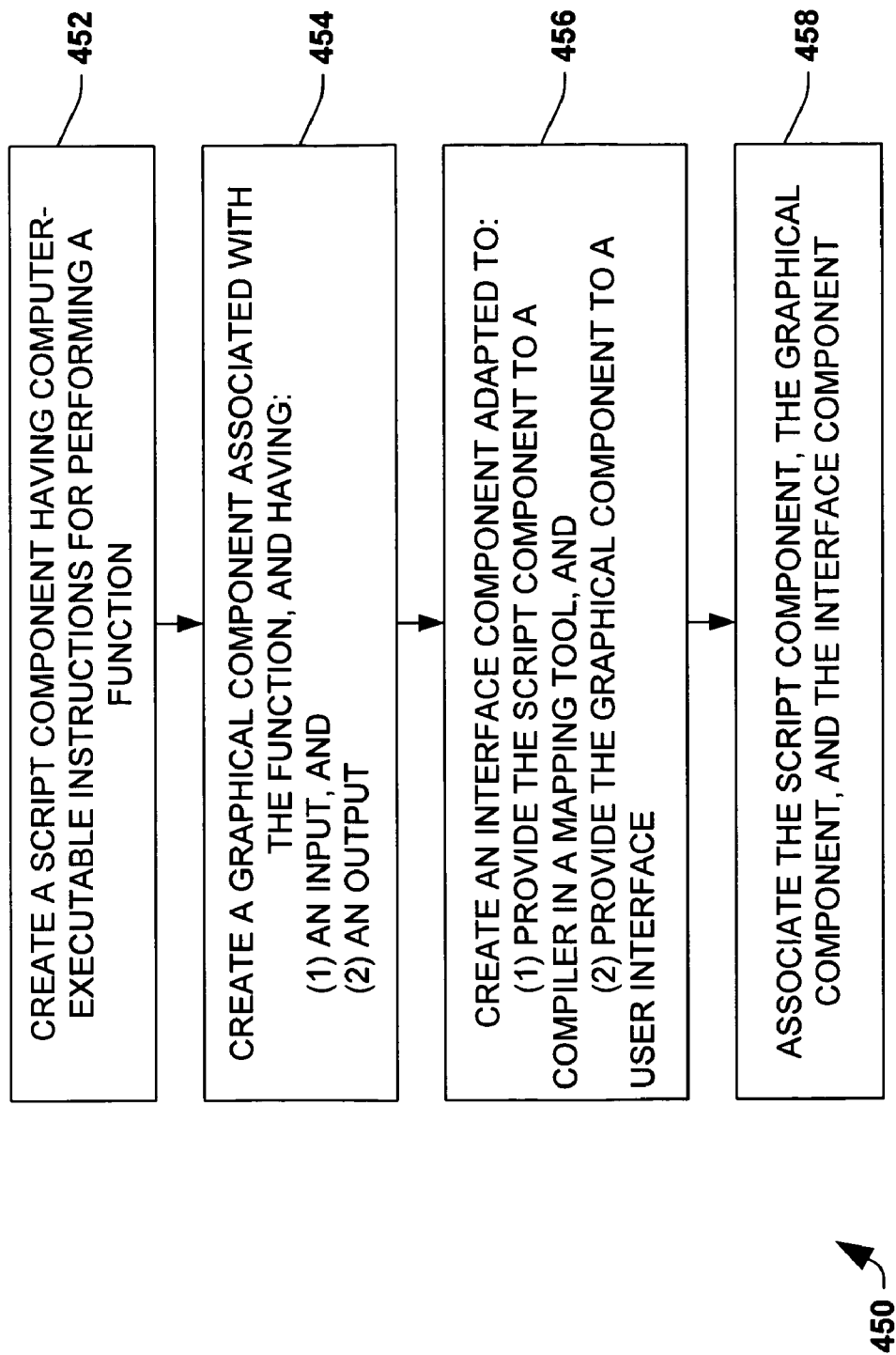
FIG. 11 is a flow diagram illustrating an exemplary method of creating a function object according to another aspect of the invention.

Referring now to FIG. 11, an exemplary method 450 of creating a function object is illustrated according to another aspect of the invention. The method 450 begins at step 452, wherein a script component is created having computer-executable instructions for performing a function. A graphical component is then created at step 454, which is associated with the function and includes an input and an output (e.g., input 10 and output 12 of graphical component 8 of FIG. 1). Thereafter at step 456, an interface component (e.g., component 14) is created, which is adapted to provide the script component created at step 452 to a mapping tool compiler, and further to provide the graphical component created at step 454 to a user interface (e.g., graphical user interface 20). The script component, the graphical component, and the interface components are then associated with each other at step 458, whereby a function object is created in accordance with the invention.

Figure 12:
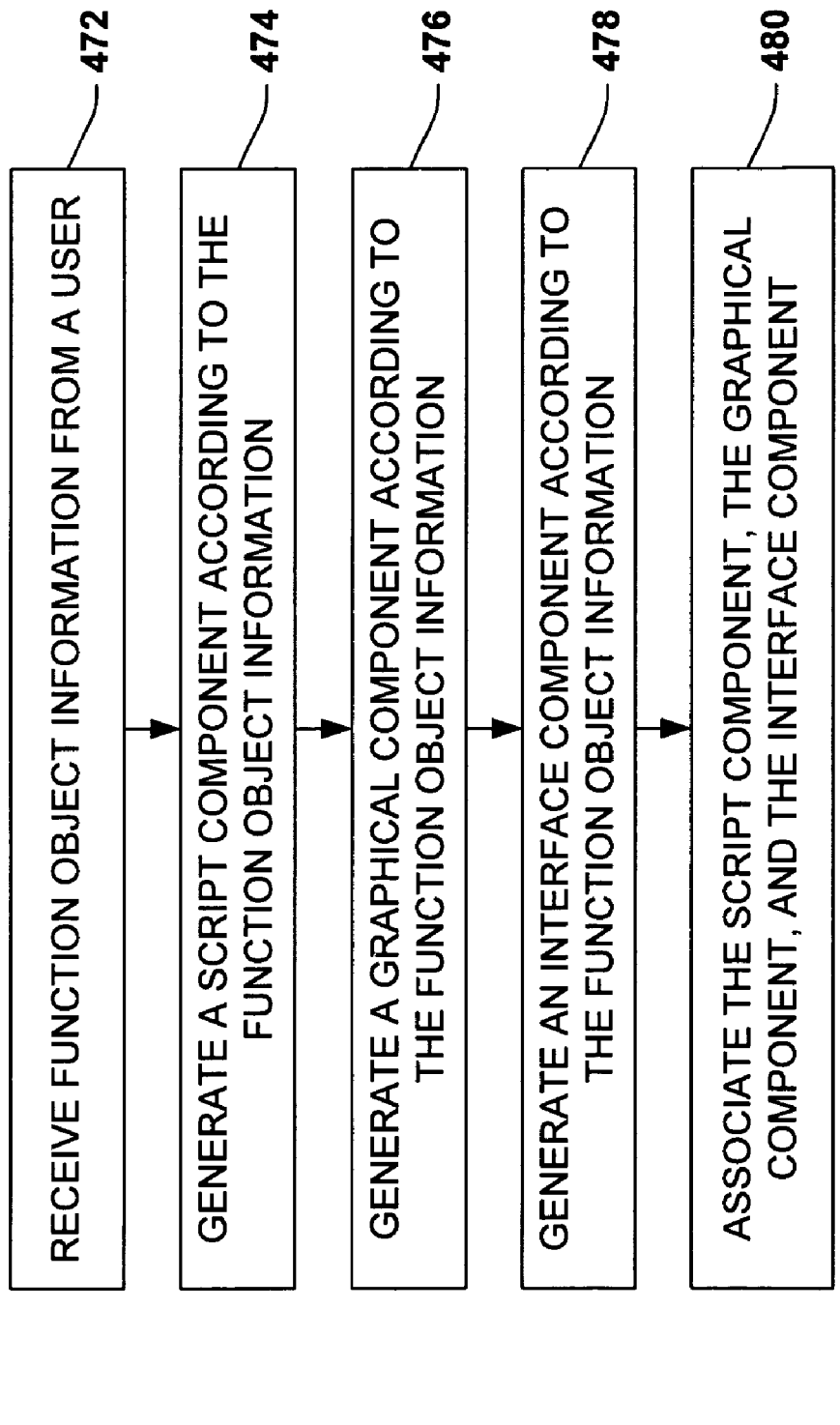
FIG. 12 is a flow diagram illustrating another exemplary method of creating a function object according to the invention.

Turning now to FIG. 12, another exemplary method 470 of creating a function object is illustrated, wherein function object information is received from a user at step 472. At step 474, a script component is generated according to the function information. The script component may include computer-executable instructions for performing the function. A graphical component is then created at step 476 according to the function information received at step 472. At step 478, an interface component is generated according to the function information, and at step 480, the script component, the graphical component, and the interface component are associated. The user may be prompted for the function information, which prompting may be in the form of a function object creation wizard.

EXEMPLARY OPERATING ENVIRONMENT

Figure 13:
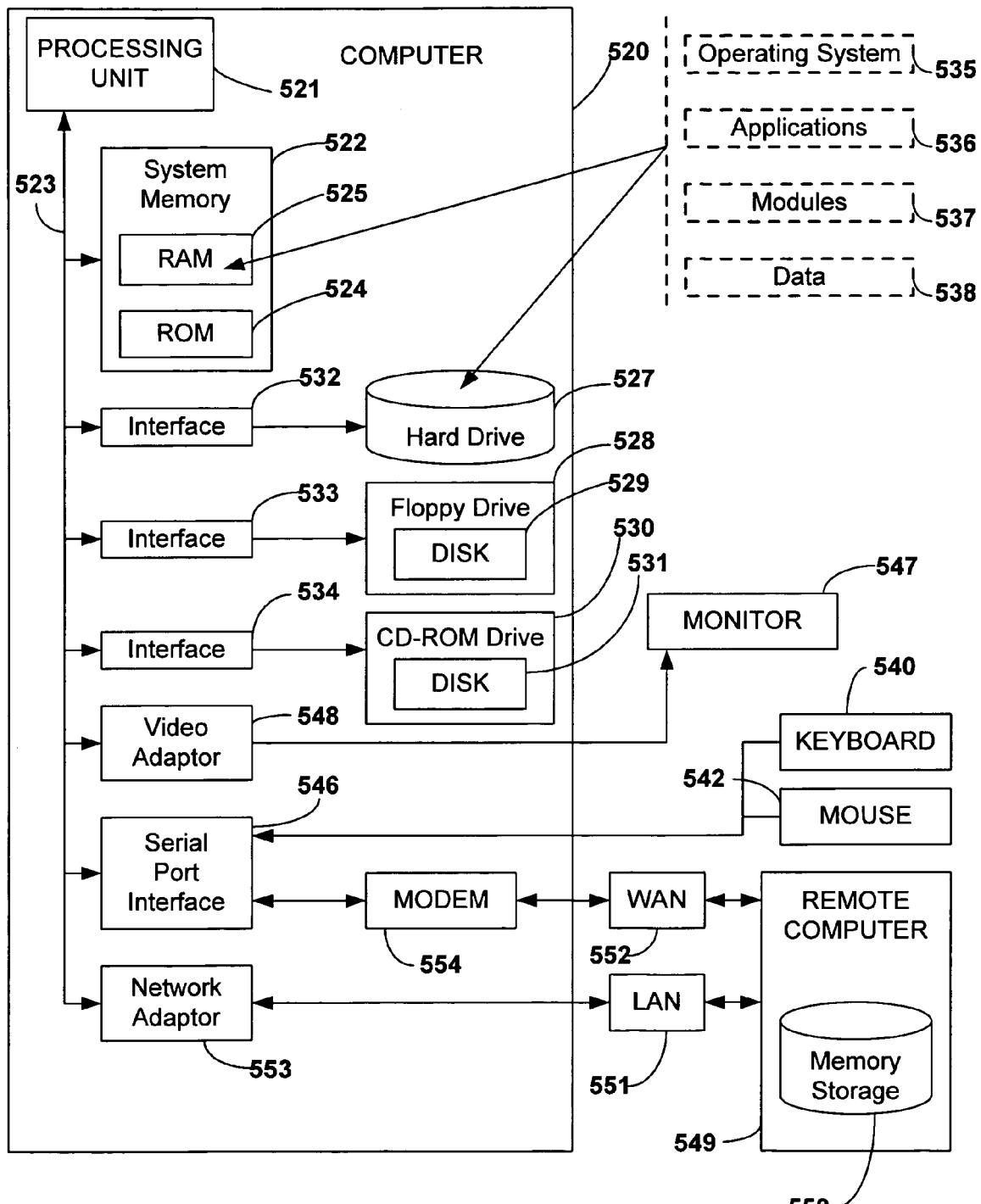
FIG. 13 is a schematic diagram illustrating an exemplary operating environment in which various aspects of the invention may be implemented.

In order to provide a context for the various aspects of the invention, FIG. 13 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary system for implementing the various aspects of the invention includes a conventional server computer 520, including a processing unit 521, a system memory 522, and a system bus 523 that couples various system components including the system memory to the processing unit 521. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 521.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 524 and random access memory (RAM) 525. A basic input/output system (BIOS), containing the basic routines that help to transfer information between elements within the server computer 520, such as during start-up, is stored in ROM 524.

The server computer 520 further includes a hard disk drive 527, a magnetic disk drive 528, e.g., to read from or write to a removable disk 529, and an optical disk drive 530, e.g., for reading a CD-ROM disk 531 or to read from or write to other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer-readable media provide nonvolatile storage of data, data structures, computer-executable instructions, etc. for the server computer 520. Although the description of computer-readable media above refers to a hard disk, a removable magnetic disk and a CD, it will be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 525, including an operating system 535, one or more application programs 536, other program modules 537, and program data 538. The operating system 535 in the illustrated computer may be the Microsoft Windows 2000 Server operating system, together with the before mentioned Microsoft Transaction Server.

A user may enter commands and information into the server computer 520 through a keyboard 540 and a pointing device, such as a mouse 542. Other input devices (not shown) may include a microphone, a joystick, a game pad, a satellite dish, a scanner, or the like. These and other input devices are often connected to the processing unit 521 through a serial port interface 546 that is coupled to the system bus, but may be connected by other interfaces, such as a parallel port, a game port or a universal serial bus (USB). A monitor 547 or other type of display device is also connected to the system bus 523 via an interface, such as a video adapter 548. In addition to the monitor, computers typically include other peripheral output devices (not shown), such as speakers and printers.

The server computer 520 may operate in a networked environment using logical connections to one or more remote computers, such as a remote client computer 549. The remote computer 549 may be a workstation, a server computer, a router, a peer device or other common network node, and typically includes many or all of the elements described relative to the server computer 520, although only a memory storage device 550 is illustrated in FIG. 14. The logical connections depicted in FIG. 14 include a local area network (LAN) 551 and a wide area network (WAN) 552. Such networking environments are commonplace in offices, enterprise-wide computer networks, intranets and the Internet.

When used in a LAN networking environment, the server computer 520 is connected to the local network 551 through a network interface or adapter 553. When used in a WAN networking environment, the server computer 520 typically includes a modem 554, or is connected to a communications server on the LAN, or has other means for establishing communications over the wide area network 552, such as the Internet. The modem 554, which may be internal or external, is connected to the system bus 523 via the serial port interface 546. In a networked environment, program modules depicted relative to the server computer 520, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 520, unless otherwise indicated. Such acts and operations are sometimes referred to as being computer-executed. It will be appreciated that the acts and symbolically represented operations include the manipulation by the processing unit 521 of electrical signals representing data bits which causes a resulting transformation or reduction of the electrical signal representation, and the maintenance of data bits at memory locations in the memory system (including the system memory 522, hard drive 527, floppy disks 529, and CD-ROM 531) to thereby reconfigure or otherwise alter the computer system's operation, as well as other processing of signals. The memory locations where such data bits are maintained are physical locations that have particular electrical, magnetic, or optical properties corresponding to the data bits.

Although the invention has been shown and described with respect to a certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary applications and implementations of the invention. In this regard, it will also be recognized that the invention includes a computer-readable medium having computer-executable instructions for performing the steps of the various methods of the invention.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A function object for use in creating a mapping in a mapping tool with a graphical user interface between a source object having a source object node and a target object having a target object node, comprising:
  a script component having computer-executable instructions stored on a computer-readable medium for performing a function;
  a graphical component associated with the function having an input and an output, the graphical component configured to allow a user to graphically associate the input with a source object node and to associate the output with a target object node in the graphical user interface, the source object node being one of a plurality of hierarchically displayed nodes conforming to a first schema and the target object node being one of a plurality of hierarchically displayed nodes conforming to a second schema; and
  an interface component having a globally unique identifier, the interface component provides the script component to a compiler in the mapping tool and provides the graphical component to the graphical user interface.

2. The function object of claim 1, the interface component further includes a category identifier component.

3. The function object of claim 1, the interface component further comprises a class identifier component.

4. The function object of claim 1, the interface component further comprises a function category identifier component associated with the function.

5. The function object of claim 4, the function category identifier component includes one of string, mathematical, logical, date, conversion, scientific, advanced, and custom.

6. The function object of claim 1, further comprising a second interface component that allows a user to drag and drop the graphical component in the graphical user interface.

7. The function object of claim 6, the second interface component is associated with the function object by the mapping tool.

8. The function object of claim 1, further comprising:
  a plurality of script components having computer-executable instructions for performing a plurality of functions; and
  a plurality of graphical components individually associated with one of the plurality of functions, individually having an input and an output, and individually configured to allow a user to graphically associate the input with a source object node and to associate the output with a target object node in the graphical user interface, the interface component provides the plurality of script components to a compiler in the mapping tool and provides the plurality of graphical components to the graphical user interface.

9. The function object of claim 8, the interface component further comprises a plurality of function category identifier components individually associated with the plurality of functions.

10. The function object of claim 9, at least one of the plurality of function category identifier components includes one of string, mathematical, logical, date, conversion, scientific, advanced, and custom.

11. The function object of claim 10, the plurality of script components having computer-executable instructions for performing a plurality of functions are in a scripting language.

12. The function object of claim 11, the scripting language is one of java script, visual basic script, and visual C++.

13. The function object of claim 1, the script component having computer-executable instructions for performing the function is in a scripting language.

14. The function object of claim 13, the scripting language is one of java script, visual basic script, and visual C++.

15. The function object of claim 1, the function object is a COM object, and the interface component is a COM interface.

16. In a mapping tool with a graphical user interface, a method of creating a mapping between a source object having a source object node and a target object having a target object node, the method comprising:
  providing a function object having a script component with computer-executable instructions for performing a function, a graphical component associated with the function and having an input and an output, and an interface component;
  displaying the graphical component in the graphical user interface;
  graphically associating a source object node with the input using a user interface selection device, the source object node displayed hierarchically amongst a plurality of source object nodes conforming to a first document structure;
  graphically associating a target object node with the output using the user interface selection device, the target object node displayed hierarchically amongst a plurality of target object nodes conforming to a second document structure; and
  creating a mapping including the computer-executable instructions, the mapping is operative to perform the function according to the source object node and to provide an output value associated with the target object node according to the function.

17. The method of claim 16, providing the function object further comprises obtaining the function object from a host computer.

18. The method of claim 17, obtaining the function object from a host computer further comprises obtaining the function object from a DLL file in the host computer.

19. The method of claim 18, obtaining the function object from a DLL file in the host computer further comprises:
    searching DLL files in the host computer;
    identifying the function object in the searched DLL files; and
    loading the function object into the mapping tool.

20. The method of claim 16, providing the function object further comprises obtaining the function object from a global communications network.

21. The method of claim 20, obtaining the function object from a global communications network further comprises obtaining the function object from an Internet web site.

22. The method of claim 21, obtaining the function object from an the Internet web site further comprises one of searching the Internet for the function object according to a mapping tool startup script, searching the Internet for the function object according to a user command, and searching a web site provided by the user for the function object.

23. The method of claim 16, further comprising:
    providing a plurality of script components with computer-executable instructions for performing one of a plurality of functions, a plurality of graphical components individually associated with one of the plurality of functions and individually having an input and an output, the interface component is associated with the plurality of script components and the plurality of graphical components; and
    displaying at least one of the plurality of graphical components in the graphical user interface.

24. The method of claim 16, providing the function object further comprises creating a wrapper object in the mapping tool, including the interface component of the function object and a second interface component configured to allow a user to drag and drop the graphical component in the graphical user interface.

25. The method of claim 16, displaying the graphical component further comprises obtaining the graphical component from a function object source via the interface component.

26. The method of claim 25, the function object source is a DLL file on a host computer.

27. The method of claim 25, obtaining the graphical component from a function object source comprises obtaining the graphical component from a DLL file via the Internet.

28. The method of claim 16, displaying the graphical component further comprises:
    displaying a function object palette in the graphical user interface;
    displaying the graphical component on the function object palette; and
    allowing a user to drag and drop the graphical component from the function object palette to a mapping screen region in the graphical user interface.

29. The method of claim 28, further comprising:
    providing a plurality of script components with computer-executable instructions for performing one of a plurality of functions, a plurality of graphical components individually associated with one of the plurality of functions and individually having an input and an output, the interface component is associated with the plurality of script components and the plurality of graphical components;
    displaying a function object palette in the graphical user interface;
    displaying at least one of the plurality of graphical components on the function object palette; and
    allowing a user to drag and drop the at least one of the plurality of graphical components from the function object palette to a mapping screen region in the graphical user interface.

30. The method of claim 16, the mapping tool further comprises a compiler component, and creating the mapping further comprises:
    invoking the compiler component to generate compiled output code; and
    providing the computer-executable instructions from the script component to the compiler via the interface component.

31. The method of claim 16, the mapping tool further comprises a compiler component, and creating the mapping further comprises:
    providing a plurality of script components with computer-executable instructions for performing one of a plurality of functions, a plurality of graphical components individually associated with one of the plurality of functions and individually having an input and an output, the interface component is associated with the plurality of script components and the plurality of graphical components;
    displaying a function object palette in the graphical user interface;
    displaying at least one of the plurality of graphical components on the function object palette;
    allowing a user to drag and drop the at least one of the plurality of graphical components from the function object palette to a mapping screen region in the graphical user interface;
    invoking the compiler component to generate compiled output code; and
    providing the computer-executable instructions from the plurality of script components to the compiler via the interface component.

32. A mapping tool with a graphical user interface for creating a mapping between a source object having a source object node and a target object having a target object node, comprising:
    means for providing a function object having a script component with computer-executable instructions for performing a function, a graphical component associated with the function and having an input and an output, and an interface component;
    means for displaying the graphical component in the graphical user interface;
    means for displaying a source object and a target object in the graphical user interface, the source object comprising a plurality of hierarchically arranged source object nodes conforming to a first schema and the target object comprising a plurality of hierarchically arranged target object nodes conforming to a second schema;
    means for graphically associating a source object node with the input and for graphically associating a target object node with the output; and
    means for creating a mapping including the computer-executable instructions, the mapping operative to perform the function according to the source object node and to provide an output value associated with the target object node according to the function.

33. In a mapping tool with a graphical user interface, a method of creating a function object for use in creating a mapping between a source object and a target object, the method comprising:
   creating a script component having computer-executable instructions for performing a function using the user interface;
   creating a graphical component associated with the function and having an input and an output, the input configured to be associated with at least one of a plurality of hierarchically displayed source object nodes of the source object, the source object nodes conforming to a first schema, and the output configured to be associated with at least one of a plurality of hierarchically displayed target object nodes of the target object, the target object nodes conforming to a second schema;
   creating an interface component that provides the script component to a compiler in the mapping tool and provides the graphical component to the graphical user interface; and
   associating the script component, the graphical component, and the interface component.

34. The method of claim 33, creating the script component further comprises receiving a user-defined text file including the computer-executable instructions and creating the script component using the computer-executable instructions from the text file.

35. The method of claim 34, the computer-executable instructions include one of basic, visual basic, VB script, C++, visual C++, java, java script, and Perl.

36. The method of claim 33, creating the script component comprises receiving function information from a user and creating the computer-executable instructions based on the function information.

37. The method of claim 33, creating the interface component comprises:
   receiving a text file from a user, the text file includes information related to the function; and
   creating the interface component according to the information in the text file.

38. The method of claim 37, the information related to the function is in XML.

39. The method of claim 33, further comprising:
   prompting a user for information related to the function object;
   receiving prompted information from the user via the graphical user interface;
   creating the script component having computer-executable instructions for performing a function using the prompted information; and
   creating the graphical component associated with the function and having an input and an output using the prompted information.

40. The method of claim 39, prompting a user for information related to the function object comprises providing a wizard in the graphical user interface.

41. A function object creation tool for creating a function object for use in creating a mapping in a mapping tool between a source object and a target object, the function object creation tool comprising:
   means for creating a script component having computer-executable instructions for performing a function using the user interface;
   means for creating a graphical component associated with the function and having an input and an output, the input configured to be associated with a source object node from amongst a hierarchically displayed arrangement of source object nodes conforming to a first document structure and the output configured to be associated with a target object node from amongst a hierarchically displayed arrangement of target object nodes conforming to a second document structure;
   means for creating an interface component that provides the script component to a compiler in the mapping tool and provides the graphical component to the graphical user interface; and
   means for associating the script component, the graphical component, and the interface component.

42. A computer-readable medium having computer-executable instructions for performing the following steps:
   providing a function object having a script component with computer-executable instructions for performing a function, a graphical component associated with the function and having an input and an output, and an interface component;
   displaying the graphical component in a user interface;
   displaying a source object and a target object in the user interface, the source object displayed as a hierarchically arranged collection of source object nodes conforming to a first schema and the target object displayed as a hierarchically arranged collection of target object nodes conforming to a second schema;
   graphically associating a source object node with the input using a user interface selection device;
   graphically associating a target object node with the output using the user interface selection device; and
   creating a mapping including the computer-executable instructions, and operative to perform the function according to the source object node, and to provide an output value associated with the target object node according to the function.

43. A computer-readable medium having computer-executable instructions for performing the following steps:
   creating a script component having computer-executable instructions for performing a function;
   creating a graphical component associated with the function and having an input and an output, the input configured to be associated with a source object node from amongst a hierarchically displayed arrangement of source object nodes conforming to a first document structure and the output configured to be associated with a target object node from amongst a hierarchically displayed arrangement of target object nodes conforming to a second document structure;
   creating an interface component that provides the script component to a compiler in a mapping tool and provides the graphical component to a graphical user interface; and
   associating the script component, the graphical component, and the interface component.

44. A function object for use in creating a mapping between a source object having a source object node and a target object having a target object node, comprising:
   a script component having computer-executable instructions stored on a computer-readable medium for performing a function;
   a graphical component associated with the function having an input and an output the graphical component configured to allow a user to graphically associate the input with a source object node and to associate the output with a target object node, the source object node selectable from a plurality of hierarchically displayed source object nodes conforming to a first schema and the target object node selectable from a plurality of hierarchically displayed target nodes conforming to a second schema; and an interface component having a globally unique identifier, the interface component provides the script component to a compiler and provides the graphical component to a graphical user interface.

45. A computer-readable medium having computer-executable instructions for performing the following steps:

creating a script component having computer-executable instructions for performing a function;

creating a graphical component associated with the function and having an input and an output, the input configured to be graphically associated with a source object node that is displayed amongst a plurality of hierarchically-arranged source object nodes conforming to a first schema, and the output configured to be graphically associated with a target object node that is displayed amongst plurality of hierarchically-arranged target object nodes conforming to a second schema;

creating an interface component that provides the script component to a compiler and provides the graphical component to a graphical user interface; and associating the script component, the graphical component, and the interface component.

* * * * *